US009742243B2

(12) United States Patent
Fairall et al.

(10) Patent No.: US 9,742,243 B2
(45) Date of Patent: Aug. 22, 2017

(54) HIGH-SPEED HIGH-POWER SWITCHED RELUCTANCE MACHINE

(71) Applicant: McMaster University, Hamilton (CA)

(72) Inventors: Earl Fairall, Hamilton (CA); Berker Bilgin, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 258 days.

(21) Appl. No.: 14/736,106

(22) Filed: Jun. 10, 2015

(65) Prior Publication Data

US 2015/0357883 A1 Dec. 10, 2015

Related U.S. Application Data

(60) Provisional application No. 62/010,187, filed on Jun. 10, 2014.

(51) Int. Cl.

| H02K 9/193 | (2006.01) |
|---|---|
| H02K 1/24 | (2006.01) |
| H02K 9/19 | (2006.01) |
| H02K 5/18 | (2006.01) |
| H02K 5/20 | (2006.01) |

(52) U.S. Cl.
CPC ............. *H02K 9/193* (2013.01); *H02K 1/246* (2013.01); *H02K 5/18* (2013.01); *H02K 5/20* (2013.01); *H02K 9/19* (2013.01); *H02K 2205/12* (2013.01)

(58) Field of Classification Search
CPC ... H02K 1/20; H02K 1/246; H02K 5/18; H02K 5/20; H02K 9/19; H02K 9/193
USPC ................................. 310/49.43–46.46, 52–65
See application file for complete search history.

(56) References Cited

U.S. PATENT DOCUMENTS

| 5,703,421 A | * | 12/1997 | Durkin ..................... H02K 1/20 |
| | | | 310/52 |
| 5,973,427 A | * | 10/1999 | Suzuki ..................... H02K 9/19 |
| | | | 310/52 |
| 7,071,659 B1 | | 7/2006 | Torrey et al. |

(Continued)

FOREIGN PATENT DOCUMENTS

EP          1630930 A2        3/2006

OTHER PUBLICATIONS

MacMinn et al., "A Very High Speed Switched-Reluctance Starter-Generator for Aircraft Engine Applications", Aerospace and Electronics Conference, 1989, NAECON 1989, pp. 1758-1764, vol. 4, May 22-26, 1989.

*Primary Examiner* — Ramon M Barrera
(74) *Attorney, Agent, or Firm* — Bereskin & Parr LLP/S.E.N.C.R.L., s.r.l.; Stephen Beney; Christopher J. Bury

(57) ABSTRACT

A switched reluctance machine designed for high-speed high-power operation. The switched reluctance machine has a rotor having a plurality of radially extending rotor poles, an interpolar filler positioned between the rotor poles, a stator having a plurality of stator poles extending radially inwardly from the inner surface of a machine frame, a stator winding positioned about each stator pole, wherein the stator wire has a rectangular cross-sectional profile, an axial cooling system, an end turn cooling system, and a cooling jacket positioned radially about the machine frame, and a power source configured to selectively supply electrical power to the one or more stator windings to induce rotation of the rotor.

2 Claims, 35 Drawing Sheets

(56) References Cited

U.S. PATENT DOCUMENTS

| | | | | |
|---|---|---|---|---|
| 8,541,914 B2* | 9/2013 | Knight | ............... | H02K 5/20 |
| | | | | 310/52 |
| 2002/0130565 A1* | 9/2002 | Tilton | ............... | H02K 5/18 |
| | | | | 310/58 |
| 2003/0222519 A1* | 12/2003 | Bostwick | ............... | H02K 9/19 |
| | | | | 310/58 |
| 2007/0210655 A1* | 9/2007 | Bahr | ............... | H02K 5/20 |
| | | | | 310/54 |
| 2010/0156205 A1* | 6/2010 | Davis | ............... | H02K 11/048 |
| | | | | 310/46 |
| 2013/0009496 A1* | 1/2013 | Maki-Ontto | ............... | H02K 9/22 |
| | | | | 310/59 |
| 2013/0062977 A1* | 3/2013 | Watanabe | ............... | H02K 9/19 |
| | | | | 310/61 |
| 2014/0265664 A1* | 9/2014 | Camilleri | ............... | H02K 15/14 |
| | | | | 310/59 |

* cited by examiner

FIG. 16E

HIGH-SPEED HIGH-POWER SWITCHED RELUCTANCE MACHINE

CROSS-REFERENCE TO RELATED APPLICATION

This application claims priority to U.S. Provisional Application No. 62/010,187 filed on Jun. 10, 2014, the entire contents of which are hereby incorporated herein by reference.

FIELD

Embodiments disclosed herein relate generally to switched reluctance machines (SRMs), and more particularly to a high-speed, high-power switched reluctance machine.

BACKGROUND

In high-power drivetrain applications, such as buses and trucks, high torque is usually needed to be delivered to the wheels at relatively low speeds. In terms of powertrain electrification, this may present significant challenges in the design of an electric traction motor (also referred to as an electric machine) capable of delivering acceptable performance. A high-power electric machine designed to deliver high torque should operate with high current and flux densities. However, for electric machines operating with high current and flux densities, in typical machine designs the size of the electric machine typically increases, often significantly, and the power density may also be significantly reduced. In addition, the efficiency of the motor may fall below an acceptable level due to high copper and hysteresis losses.

BRIEF DESCRIPTION OF THE DRAWINGS

For a better understanding of the described embodiments and to show more clearly how they may be carried into effect, reference will now be made, by way of example, to the accompanying drawings in which:

FIG. 16E shows simulation results for the torque ripple of a high-speed high-power switched reluctance machine;

Figure 1:
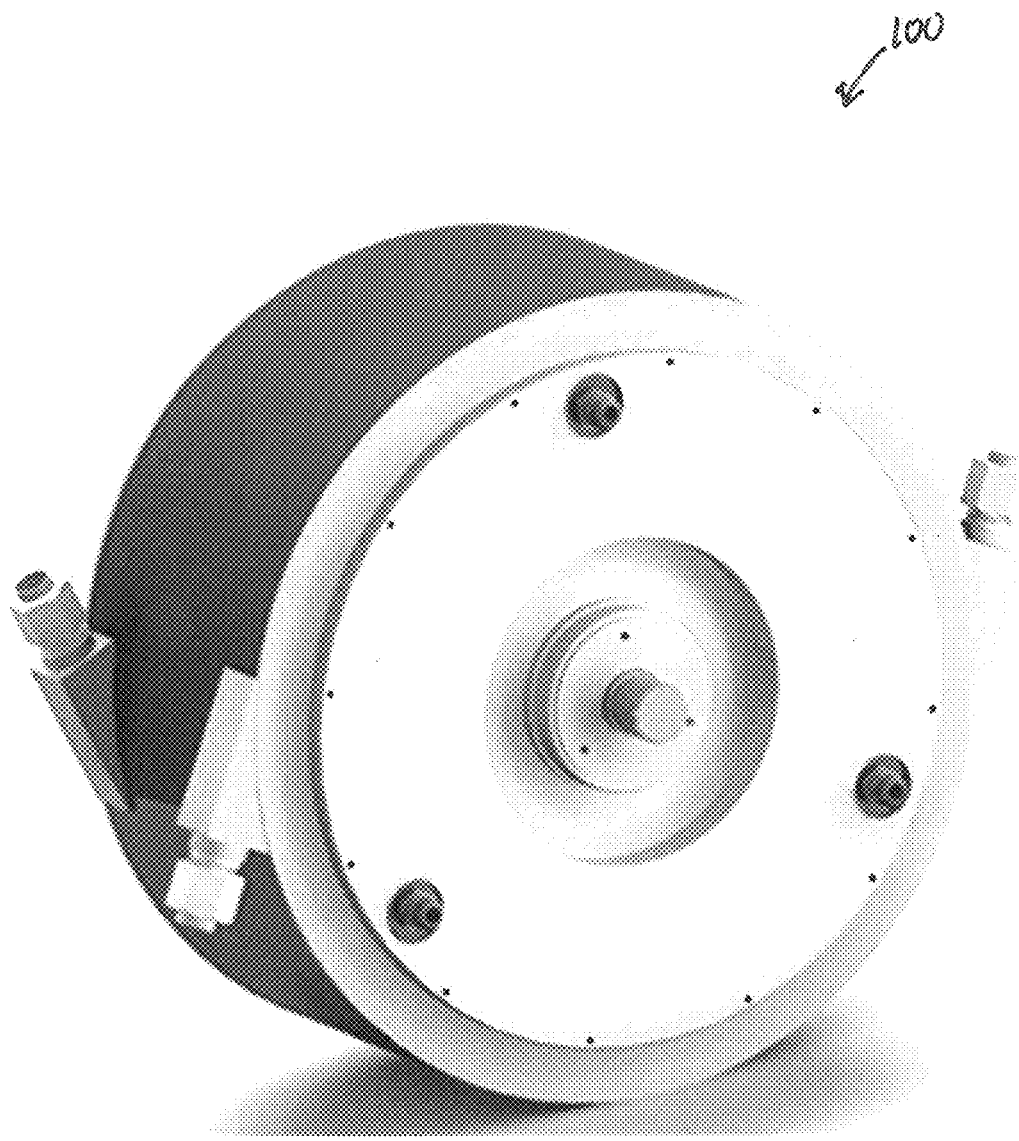
FIG. 1 is a perspective view of an example of a high-speed high-power switched reluctance machine.

Further aspects and features of the embodiments described herein will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

DESCRIPTION OF EXAMPLE EMBODIMENTS

Various systems or methods are described below to provide an example of an embodiment of each claimed invention. No embodiment described below limits any claimed invention and any claimed invention may cover systems and methods that differ from those described below. The claimed inventions are not limited to systems and methods having all of the features of any one system or method described below or to features common to multiple or all of the systems or methods described below. It is possible that a system or method described below is not an embodiment of any claimed invention. Any invention disclosed in a system or method described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

High speed electric machines may offer a number of advantages to many industries. For example, in generator applications such as those that exist in aerospace, e.g. turboexpanders and turbochargers, high speed machines may be directly coupled to the propulsive unit to offer a number of reliability, performance and cost advantages to the auxiliary power system. As another example, in manufacturing, high speed machines may enable faster production capabilities, longer tool life, and improved part quality. As yet another example, in centrifuges, high rotational speed typically enhances molecular diffusion.

High power density electric machines are also becoming of increasing interest to the automotive industry in the design of high power drivetrains for battery- and hybrid-electric vehicles, and to the aerospace industry, in which the propulsive efficiency of vehicles is of significant importance. In both of these industries, decreasing vehicular mass is often an avenue to propulsive efficiency enhancement: reducing the mass reduces the amount of energy required to propel it, thus saving fuel. High speed machines may therefore be of particular interest in applications where low mass is desired.

Increased rotational speeds can be accommodated in powertrain applications using mechanical gear systems, which can have relatively high efficiency. Accordingly, the increased shaft speed of the machine can be geared down to comply with the powertrain requirements, so that the power can be delivered to the wheels at an acceptable rotational speed.

One method of increasing the power density of an electric machine—which may be defined as a ratio of rated power output (e.g. where power is defined as the product of angular speed and torque) to mass, e.g. kW/kg—is to increase the operational speed of the machine. For example, for an electrical machine, torque may be defined as:

$$\tau = \frac{\pi}{2} D^2 L B_{avg} Q \qquad (1)$$

where D is the rotor diameter, L is the rotor axial length, B is the average flux density in the airgap, and Q is the electrical loading. Assuming an application has a power requirement; torque is inversely proportional to angular speed. Assuming flux density and the machine specific parameter Q remain approximately constant for a given power requirement, increasing the designed speed of the machine would result in a decrease in the diameter or length of the machine. Of course, in a physical context, reduced machine length or diameter would correspond to a decrease in machine mass.

However, designing an electric machine to operate at higher rotational speeds may present a number of challenges. For example, in high-speed operation, the fundamental frequency and rate of change of flux linkage in the electric machine will be higher. These increases raise two important issues in terms of electromagnetic design. First, with higher frequency operation, eddy current losses in the electrical steel start dominating. In addition, depending on the coil design, the skin and proximity effect on the windings might become more significant, leading to higher effective resistance and, hence, higher copper losses. When the rate of change of flux linkage becomes higher, the machine requires higher voltage to control the current. For a limited input voltage, the machine should have significant field weakening capability to extend the speed range. Second, eddy current losses on the rotor will be more significant when operating at high speeds. Therefore, the capability of extracting the heat from the rotor becomes very important.

The rotor should also have a low rotational inertia and high structural integrity to handle the strong centrifugal forces and stresses that can be expected during high-speed operation.

Also, in high-power drivetrain applications, such as buses and trucks, high torque is usually needed to be delivered to the wheels at relatively low speed. In terms of powertrain electrification, this brings significant challenge in the design of the electric traction motor (also referred to as an electric machine). A high-power electric machine designed to deliver high torque should operate with high current and flux densities. In this case, the size of the machine might end up larger and the power density drops drastically. In addition, the efficiency of the motor might end up too low due to high copper and hysteresis losses.

Considering all these aspects, a Switched Reluctance Machine (SRM) may be considered a promising candidate for high-speed high-power operation as compared to interior permanent magnet synchronous (IPMSM) and induction (IM) machines. For example, the rotor of a SRM has a simple and robust construction. Unlike IPMSM or IM, SRM has no magnets or windings on the rotor. The lack of magnetization source on the rotor enables better field weakening capability and wider extended speed range. The resistance of rotor windings in IM and the coercivity of permanent magnets in IPMSM are highly dependent on temperature. Since higher eddy current losses at higher frequencies generate more heat on the rotor, this might be a limiting factor in achieving high-power density and high-efficiency when the high-speed high-power traction motor is designed with IM or IPMSM. Furthermore, high centrifugal forces at high speed operation create significant challenges in terms of the structural integrity of the rotor to keep the rotor windings in IM or rotor magnets in IPMSM in place. In this case, the rotor slots in IM and permanent magnets in IPMSM might need to be located deeper inside the rotor back iron, which will reduce the efficiency, power factor and power density.

While SRM may be considered a promising candidate for high-speed high-power operation, designing a high-speed high-power SRM may present a number of challenges in terms of electromagnetic, thermal, and structural design. It is believed that successful operation of a high speed motor can be achieved by considering all these aspects during the design process. For example, in order to design a high-speed, high-power motor having acceptable performance characteristics for use in a powertrain application, the control parameters, torque ripple, and efficiency of the SRM should be analyzed carefully, both at high- and low-speeds. In addition, a high-power converter may be required to control the speed and torque of the motor. Also, a high-speed high-power traction motor is preferably coupled to a mechanical transmission. The design parameters of the transmission should be defined to deliver the motor power to the wheels considering vehicle traction requirements.

As disclosed herein, many design aspects have been identified as important to providing a SRM machine capable of providing acceptable performance during operation at high speeds. These design aspects have been considered and applied to develop solutions for e.g. electrodynamic, thermal, and structural issues, resulting in a high-speed (22,000 rpm) high-power (150 kW) SRM suitable for, e.g., traction applications. Extensive computer simulation has been used during development to improve electrodynamic, thermal, and structural performance of the disclosed high-speed high-power SRM. Further, unique construction techniques have been implemented to improve electrodynamic, thermal, and structural performance of the disclosed high-speed high-power SRM. Examples of simulation and experimental results are provided herein to provide examples of the performance of the developed SRM.

In one broad aspect, there is provided a switched reluctance machine designed for high-speed high-power operation, the switched reluctance machine comprising: a shaft having a first end, a second end, and a longitudinal axis, the shaft being rotationally supported at the first end by a first bearing and at the second end by a second bearing; a rotor coupled to the shaft, the rotor having an inner rotor diameter and a plurality of rotor poles extending radially from the inner rotor diameter, the distal ends of the rotor poles defining an outer rotor diameter; an interpolar filler positioned between each of the plurality of rotor poles and extending from the inner rotor diameter to the outer rotor diameter; a machine frame positioned about the rotor, the machine frame having spaced-apart first and second ends, an inner surface, and an outer surface; a first machine end plate secured to the first end of the machine frame and configured to support the first bearing; a second machine end plate secured to the second end of the machine frame and configured to support the second bearing; a plurality of stator poles extending radially inwardly from the inner surface of the machine frame, the distal ends of the stator poles defining an inner stator diameter, the inner stator diameter and the outer rotor diameter defining an air gap therebetween; a stator winding positioned about each of the plurality of stator poles, each stator winding comprising one or more strands of a stator wire wound about its respective stator pole, each of the one or more strands of stator wire having a rectangular cross-sectional profile; an axial cooling system comprising one or more axial cooling conduits positioned between the stator poles and radially outward of the inner stator diameter, each axial cooling conduit having an inlet end and an outlet end and configured to allow circulation of an axial cooling fluid between its inlet and outlet ends; an end turn cooling system comprising one or more axial cooling conduits positioned proximate the axial ends of the stator windings, each end turn cooling conduit having an inlet end and an outlet end and configured to allow circulation of an end turn cooling fluid between its inlet and outlet ends; one or more cooling ribs extending radially outwardly from the outer surface of the machine frame; a cooling jacket comprising one or more cooling jacket conduits positioned radially about the machine frame, each cooling jacket conduit having an inlet end and an outlet end and configured to allow circulation of a cooling jacket fluid between its inlet and outlet ends; and a power source configured to selectively supply electrical power to the one or more stator windings to induce rotation of the rotor.

In some embodiments, the plurality of rotor poles comprises 8 rotor poles, and wherein the plurality of stator poles comprises 12 stator poles.

These and other aspects and features of various embodiments will be described in greater detail below. While some examples discussed herein are directed to SRM's for use in electric and/or hybrid vehicle applications, it will be appreciated that the SRM disclosed herein may be used in any suitable application. Furthermore, the term 'hybrid vehicle' is to be interpreted broadly, and therefore may be applicable to vehicles including small passenger car, minivans, sports utility vehicles, pickup trucks, vans, buses, and trucks. Other applications may be possible, including off-road vehicles, tractors, mining and construction vehicles, hybrid boats and other naval applications.

Figure 2:
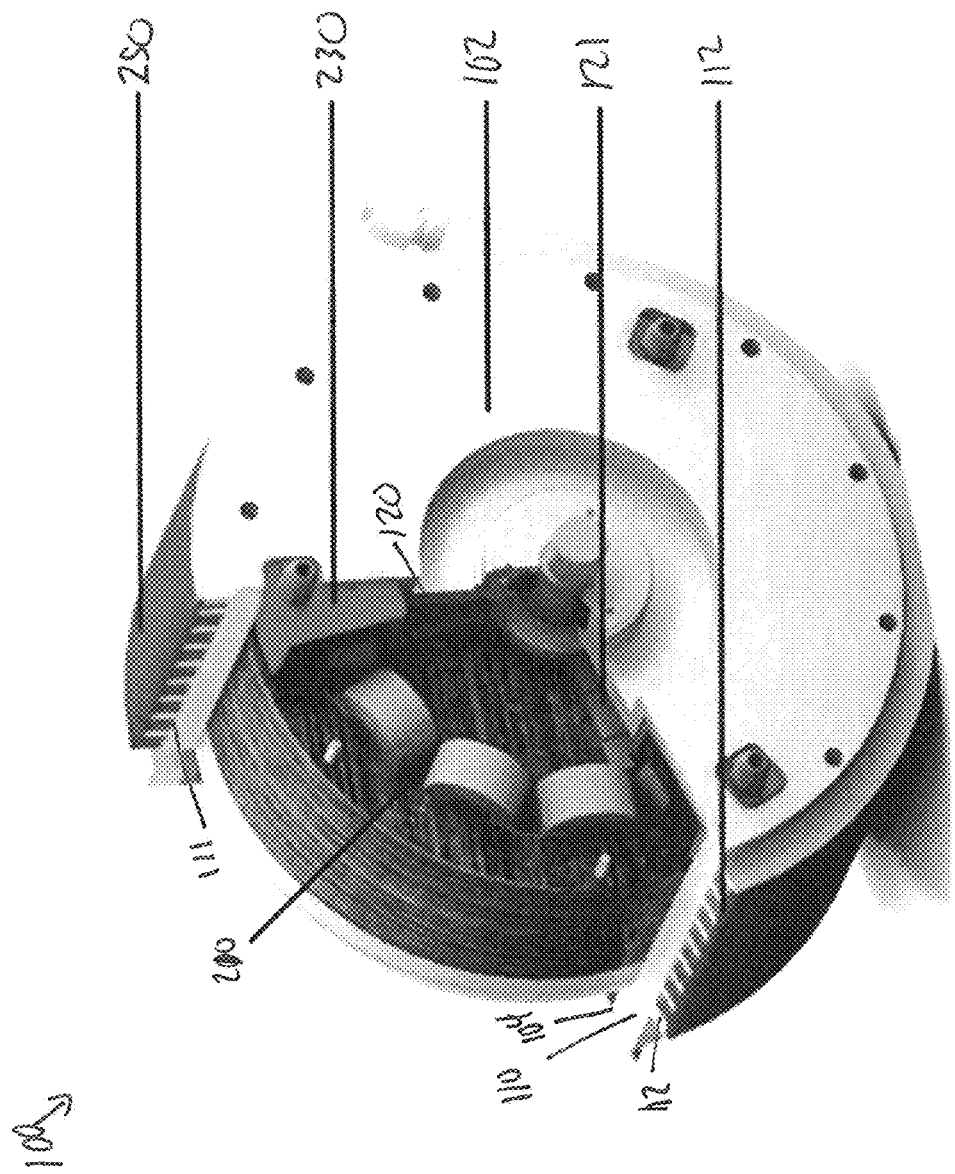
FIG. 2 is a perspective view of the switched reluctance machine of FIG. 1, with a section of the outer components removed.
Figure 3:
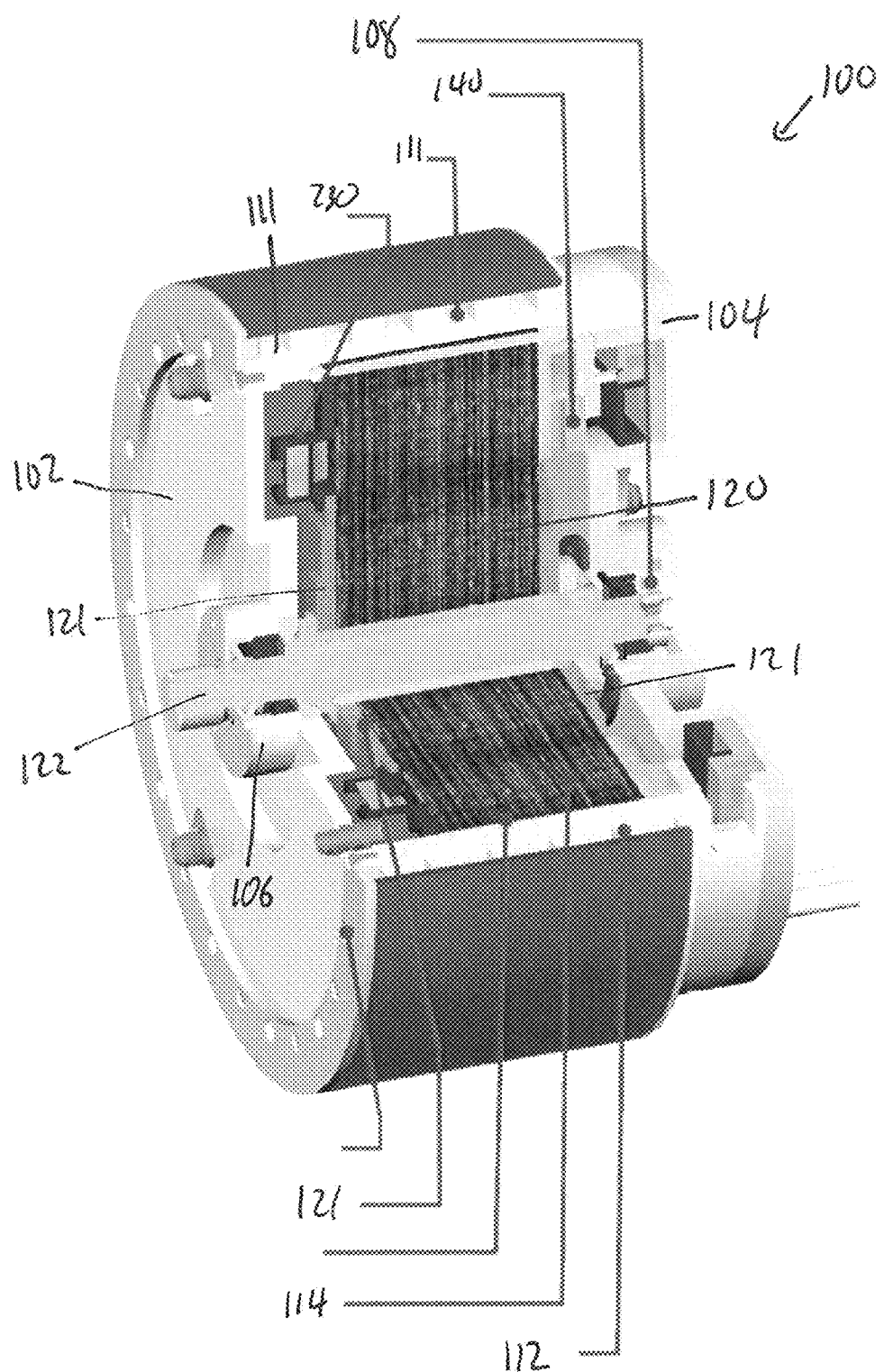
FIG. 3 is perspective view of the switched reluctance machine of FIG. 1, with another section of the components removed.

Referring to FIGS. 1 to 3, an embodiment of a high-speed high-power SRM, designated generally as 100 is shown. In this example, the SRM has been designed for traction applications, and has been designed to deliver 150 kW at 22,000 rpm.

With reference to FIGS. 2 and 3, the high-speed high-power SRM 100 includes an annular frame 110, first and second frame end plates 102 and 104, and a rotor 120 mounted on a shaft 122. The shaft 122 is supported at each end by bearings 106, 108 mounted in frame end plates 102 and 104, thereby securing the shaft and rotor in position (e.g. concentrically) within frame 110, while allowing rotor 120 and shaft 122 to rotate about the axis of shaft 122. Stack end plates 121 are used to prevent rotor 120 from moving relative to shaft 122.

Figure 4:
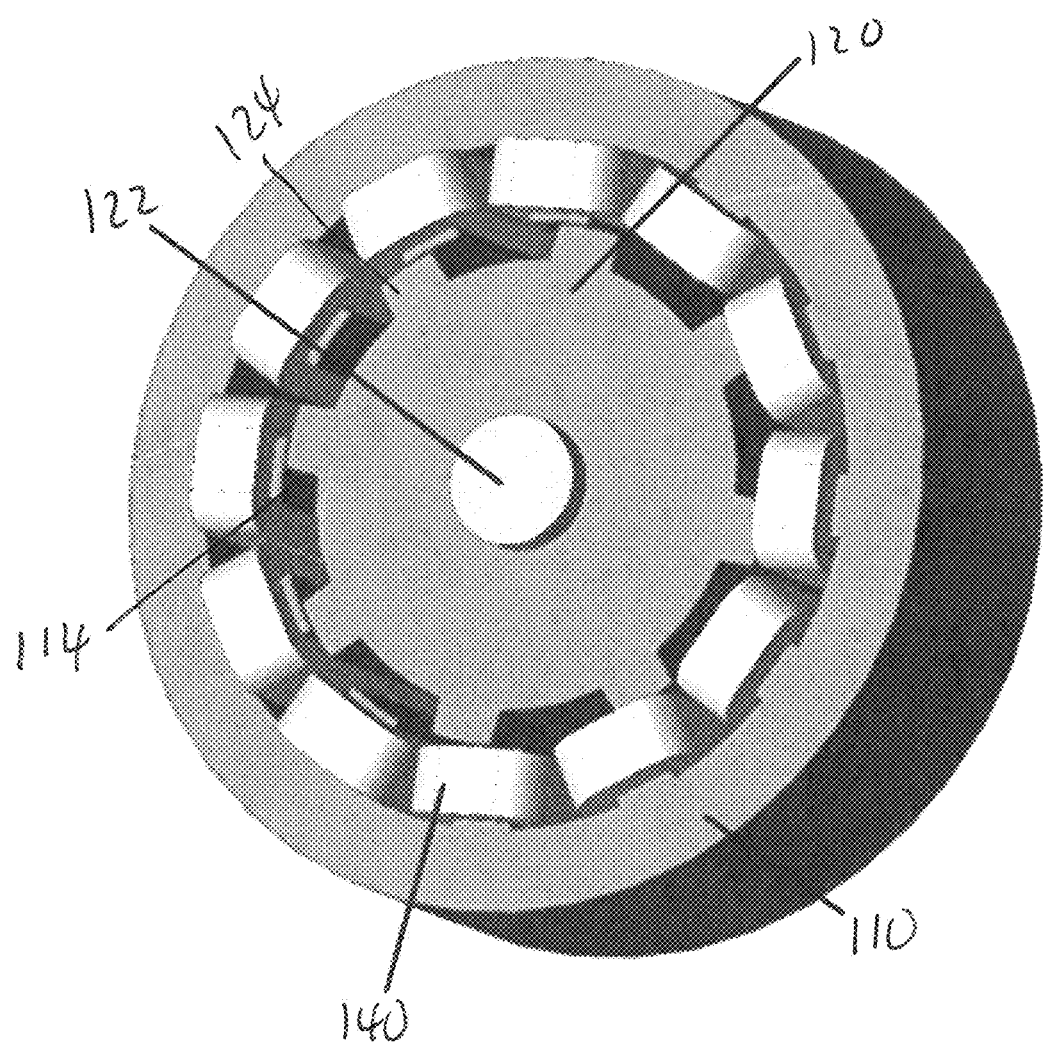
FIG. 4 is a perspective view of the inner structure of a high-speed high-power switched reluctance machine according to another example.
Figure 5:
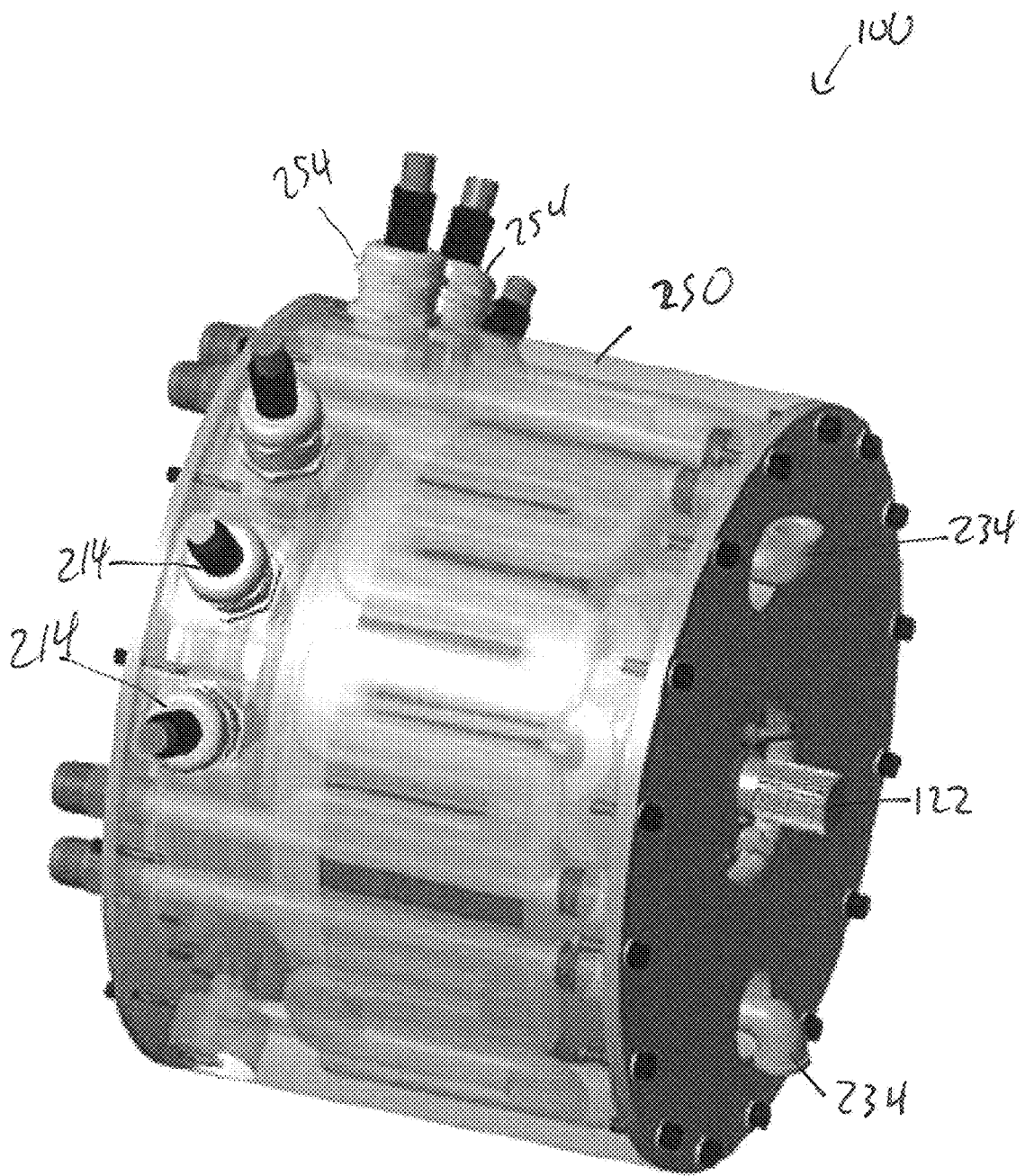
FIG. 5 is a perspective view of another example of a high-speed high-power switched reluctance machine, with three cooling systems.

SRM 100 includes a plurality of stator windings or coils 140. Each winding 140 is positioned around one of plurality of stator poles 114 extending radially inwardly from the inner surface of the machine frame 110. Referring to FIG. 4, the inner structure of the high-speed high-power switched reluctance machine 100 has 12 stator poles and 8 rotor poles. Analysis indicates that a SRM with such a 12/8 topology will be capable of delivering 150 kW at 22,000 rpm. However, high-speed high-power SRMs designed for different speed and power requirements (e.g. higher or lower power outputs and/or higher or lower design speeds) may include a higher or lower number of stator and/or rotor poles. The number of stator and rotor poles in a SRM (e.g. the SRM topology) required to achieve a given set of performance parameters may be determined by analyzing the electromagnetic, thermal, and structural parameters during the design and/or development of the SRM, as discussed herein.

Thermal Management

Figure 17:
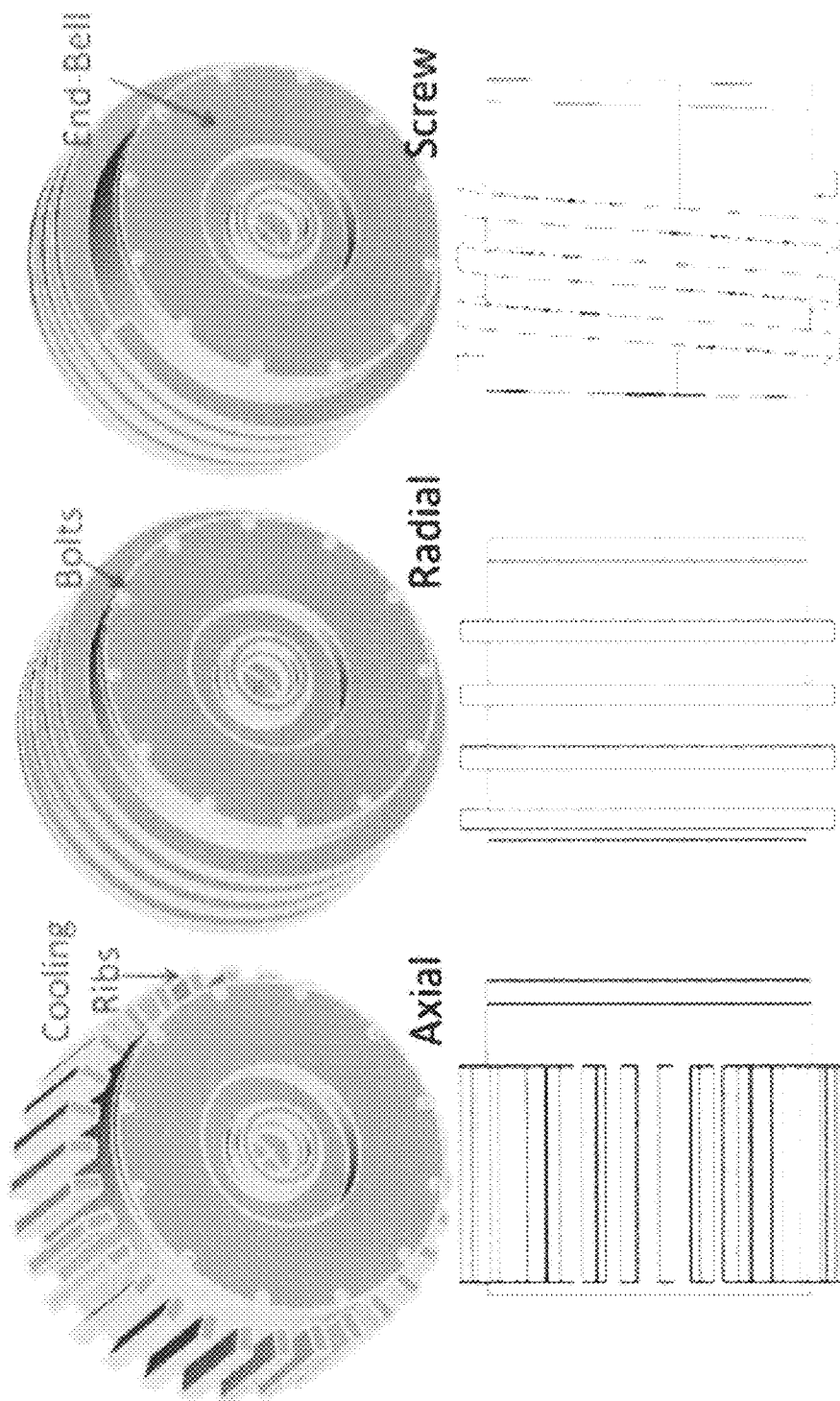
FIG. 17 shows perspective and side views of example cooling ribs for the frame of a high-speed high-power switched reluctance machine.

Frame 110 has one or more cooling ribs 112 extending radially outwardly from the outer surface 111 of the frame 110 to assist in heat dissipation. While in the illustrated example the cooling ribs 112 are radial cooling ribs, it will be appreciated that other types of cooling ribs (e.g. axial, screw, and the like, examples of which are illustrated in FIG. 17) may be used in alternative embodiments. For example, in some embodiments screw type cooling ribs may assist in achieving a lower thermal resistance. The design of the cooling ribs for a high-speed high-power SRM (e.g. the type of ribs, number of ribs, rib dimensions, frame and/or rib material, etc.) can be determined based on a consideration of a number of factors, including the heat dissipation performance required for the SRM, noise and vibration analyses in the high-speed high-power SRM. Preferably, the design of the cooling ribs is developed and/or optimized through the use of thermal, stress, and/or noise, vibration, and harshness (NVH) analyses, including computer-assisted modeling.

In order to achieve better heat dissipation of the stator windings 140, SRM 100 includes an axial cooling system, referred to generally as 210, and an end-turn cooling system, referred to generally as 230. Both the axial and end turn cooling systems of SRM 100 use potting materials with low electrical and high thermal conductivity. The materials used also withstand high mechanical stress. Examples of suitable potting materials include, but are not limited to, epoxy or silicon encapsulants.

SRM 100 is also provided with a cooling jacket, referred to generally as 250, positioned around the cooling ribs 112. Example designs for each of the cooling systems 210, 230, and 250 will be discussed with reference to FIGS. 5 to 9B.

Figure 6:
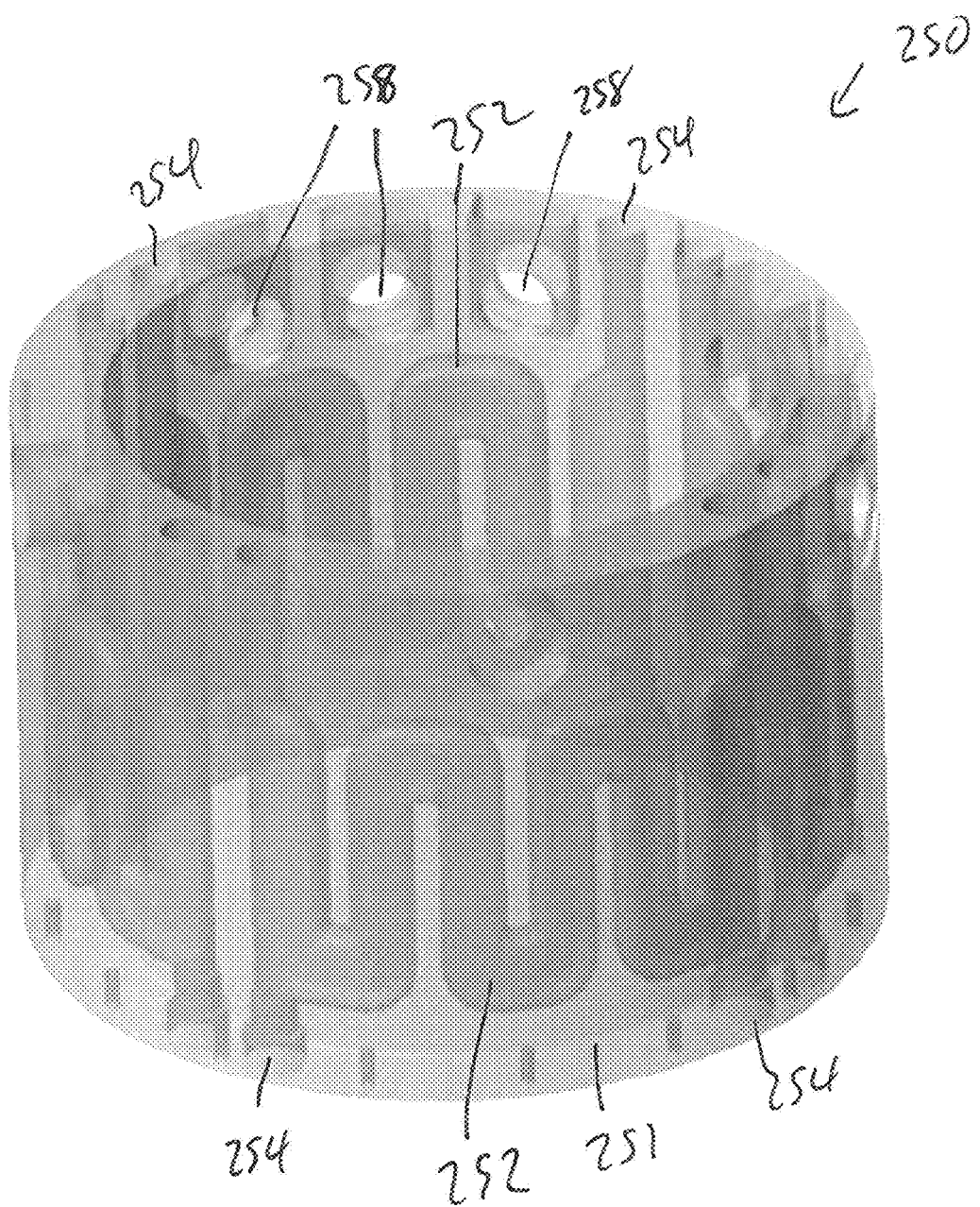
FIG. 6 is a perspective view of the cooling jacket of FIG. 5, with the cooling jacket illustrated as translucent.

As shown in FIG. 6, cooling jacket 250 includes a cooling jacket body 251 in which a plurality of flow channels 252 are formed. Flow channels 252 extend between inlet and/or outlet ends 254, and are configured to allow the circulation of a cooling fluid through the cooling jacket body 251. In the illustrated example, a plurality of bores 258 extend radially through the cooling jacket body 251. Bores 258 may be used to accommodate wiring for the electrical phase connections, and/or to accommodate conduits for the axial cooling system. An optional cooling jacket cover 255 is shown in FIG. 7.

Figure 7:
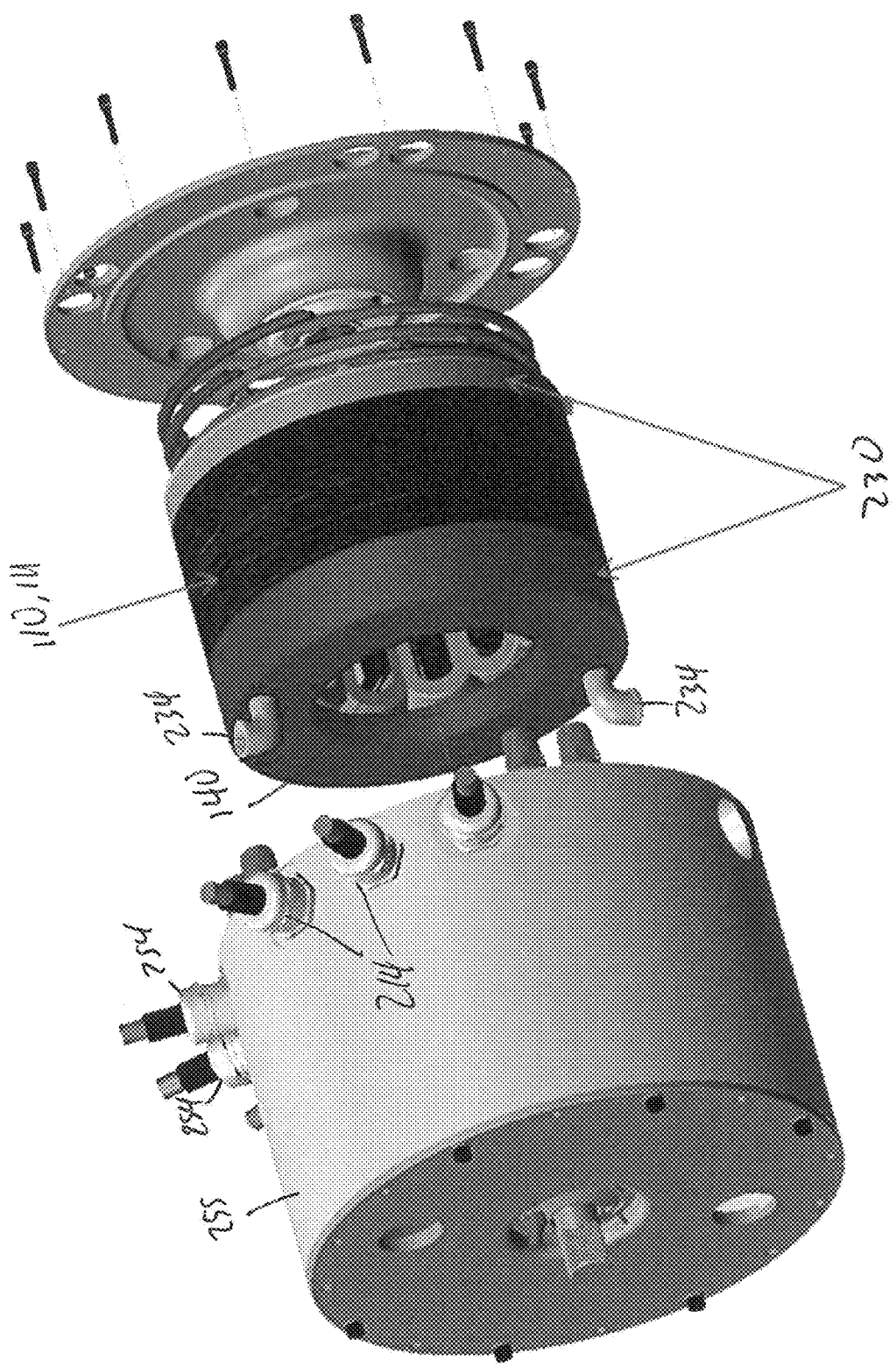
FIG. 7 is a partially exploded perspective view of the high-speed high-power switched reluctance machine of FIG. 5, showing components of an end turn cooling system.

As shown in FIG. 7, end-turn cooling system 230 includes one or more conduits or flow channels 232 positioned proximate the axial ends of stator windings 140. Flow channels 232 extend between inlet and/or outlet ends 234, and are configured to allow the circulation of a cooling fluid through the flow channels 232.

Figure 8:
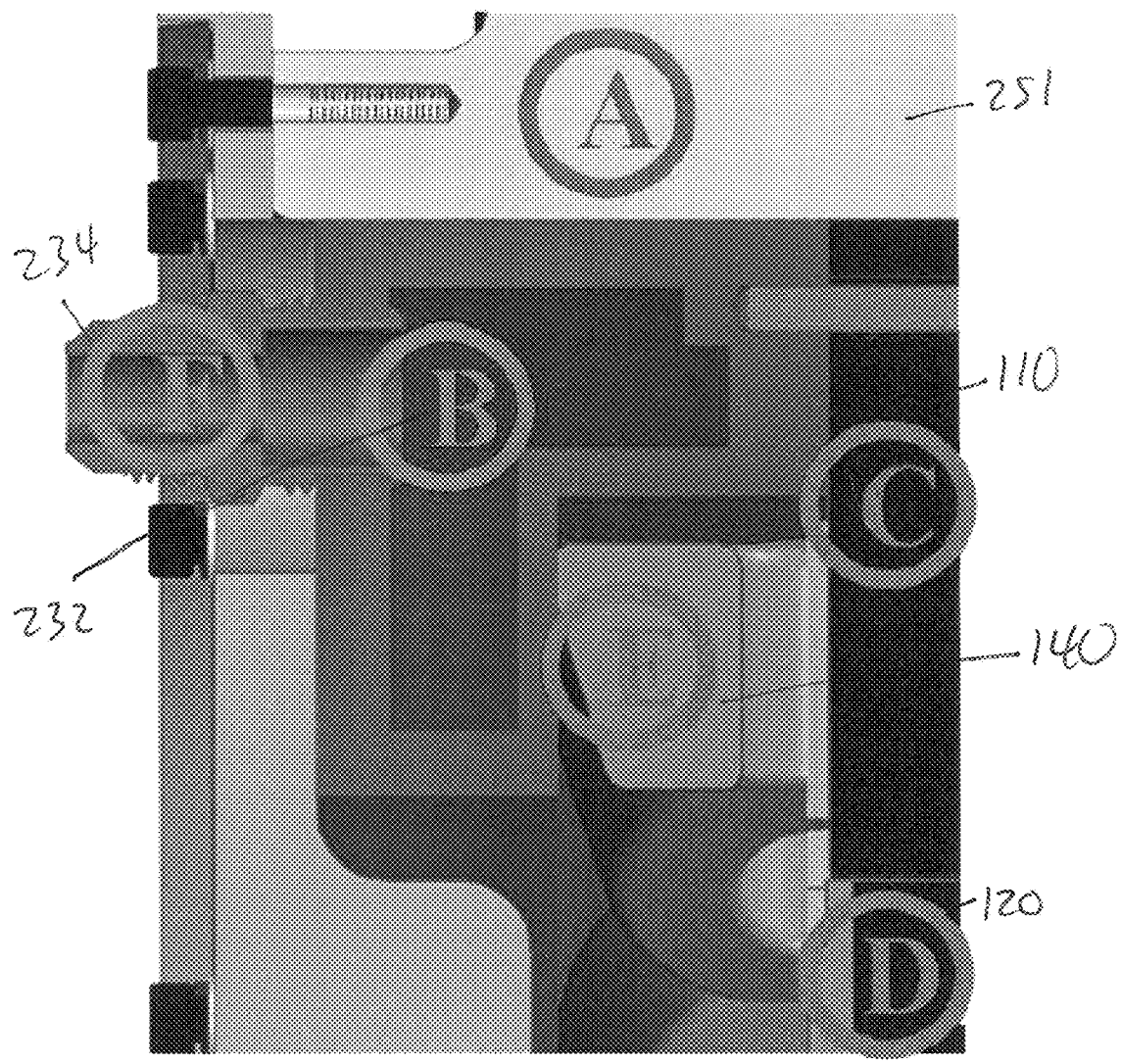
FIG. 8 is a cross-sectional view of a portion of the end turn cooling system of FIG. 7.

As shown in FIGS. 7 and 8, end-turn cooling system 230 includes one or more conduits or flow channels 232 positioned proximate the axial ends of stator windings 140. Flow channels 232 extend between inlet and/or outlet ends 234, and are configured to allow the circulation of a cooling fluid through the flow channels 232.

Figure 9A:
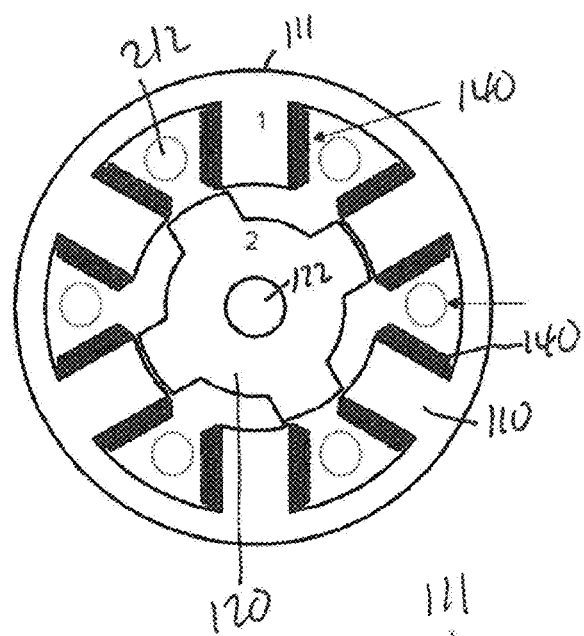
FIG. 9A is a schematic end-section view of an axial cooling system for a high-speed high-power switched reluctance machine.
Figure 9B:
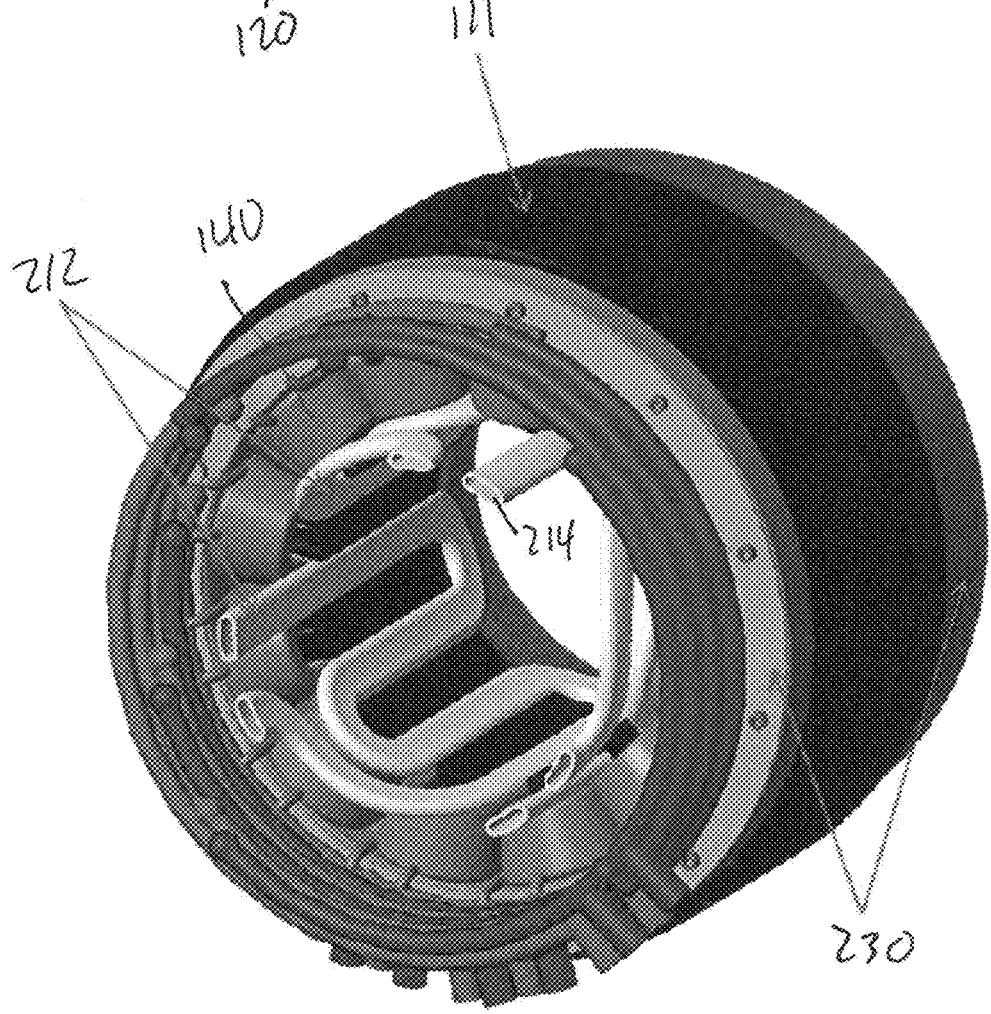
FIG. 9B is an end perspective view of the high-speed high-power switched reluctance machine of FIG. 5, showing components of an axial cooling system.

As shown in FIGS. 9A and 9B, axial cooling system 210 includes one or more conduits or flow channels 212 extending axially between stator windings 140. Flow channels 212 extend between inlet and/or outlet ends 214, and are configured to allow the circulation of a cooling fluid through the flow channels 232.

The design of the cooling systems for a high-speed high-power SRM (e.g. the number of channels, channel dimensions, cooling fluid flow rates, conduit materials, etc.) can be determined based on a consideration of a the heat dissipation performance required for an SRM to achieve a given set of performance parameters. Preferably, the design of the cooling systems is developed and/or optimized through the use of thermal, stress, and/or noise, vibration, and harshness (NVH) analyses, including computer-assisted modeling.

Figure 10:
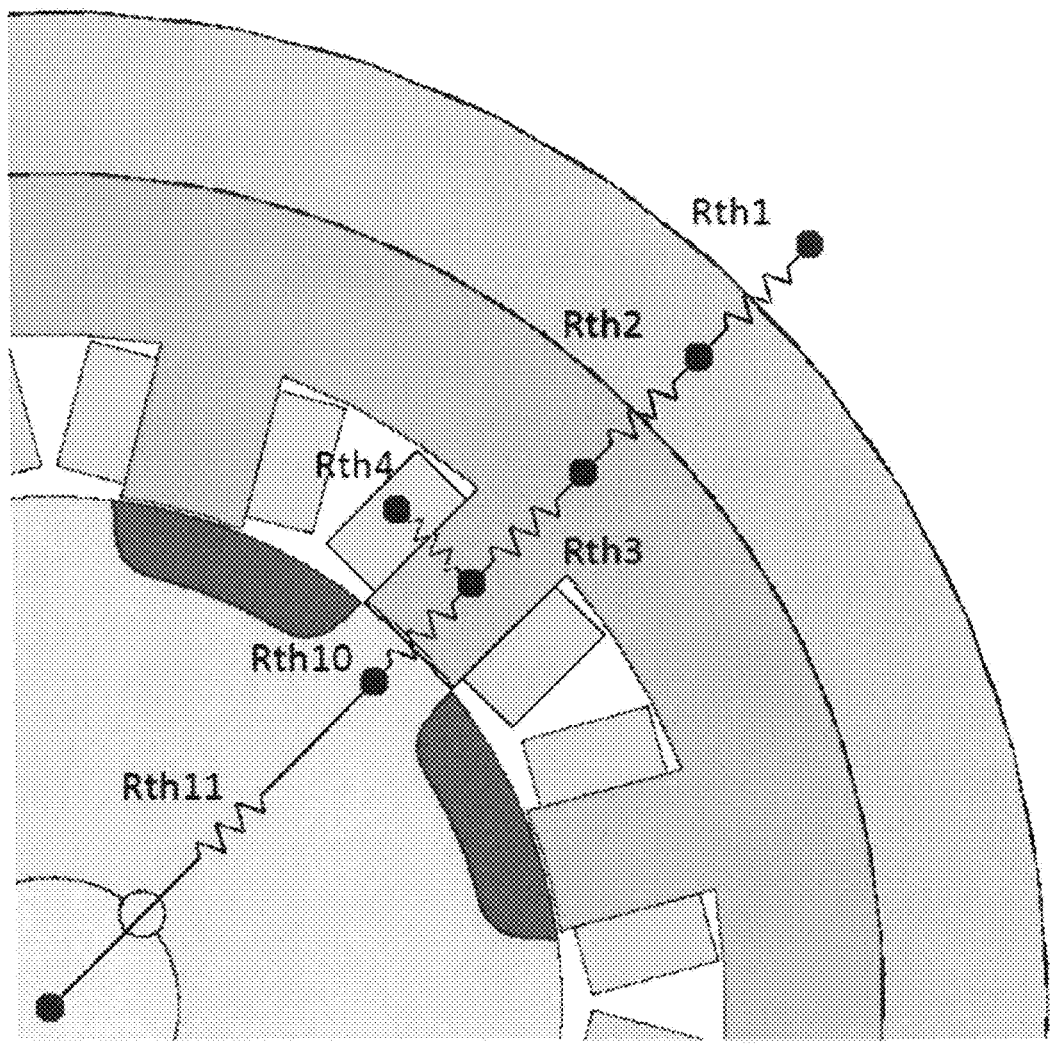
FIG. 10 is a schematic view of a lumped parameter model of the thermal behavior of a high-speed high-power switched reluctance machine.
Figure 11:
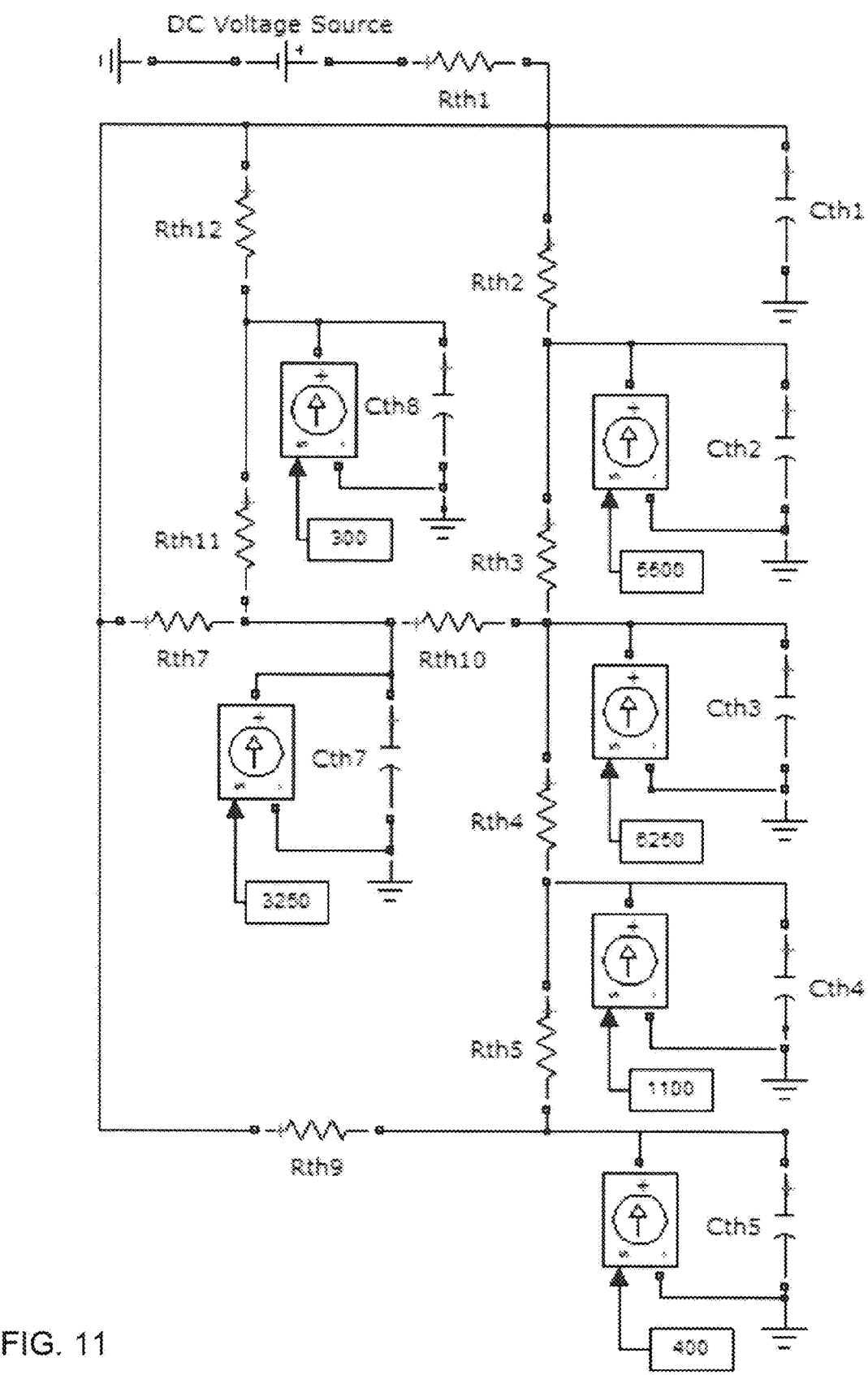
FIG. 11 is a schematic circuit diagram for the lumped parameter model of FIG. 10.

For example, with reference to FIGS. 10 and 11, a lumped parameter model may be used to estimate the thermal behavior of an SRM. In the illustrated example, resistors represent thermal resistance, capacitors represent thermal capacitance, and current represents injection loss input. Based on the results of such a model, it was determined that for SRM 100 to deliver 150 kW at 22,000 rpm, additional cooling was required beyond a cooling jacket and end turn cooling. However, high-speed high-power SRMs designed for different speed and power requirements may include a higher or lower number of cooling systems.

Bar Wire Stator Coils

Figure 12:
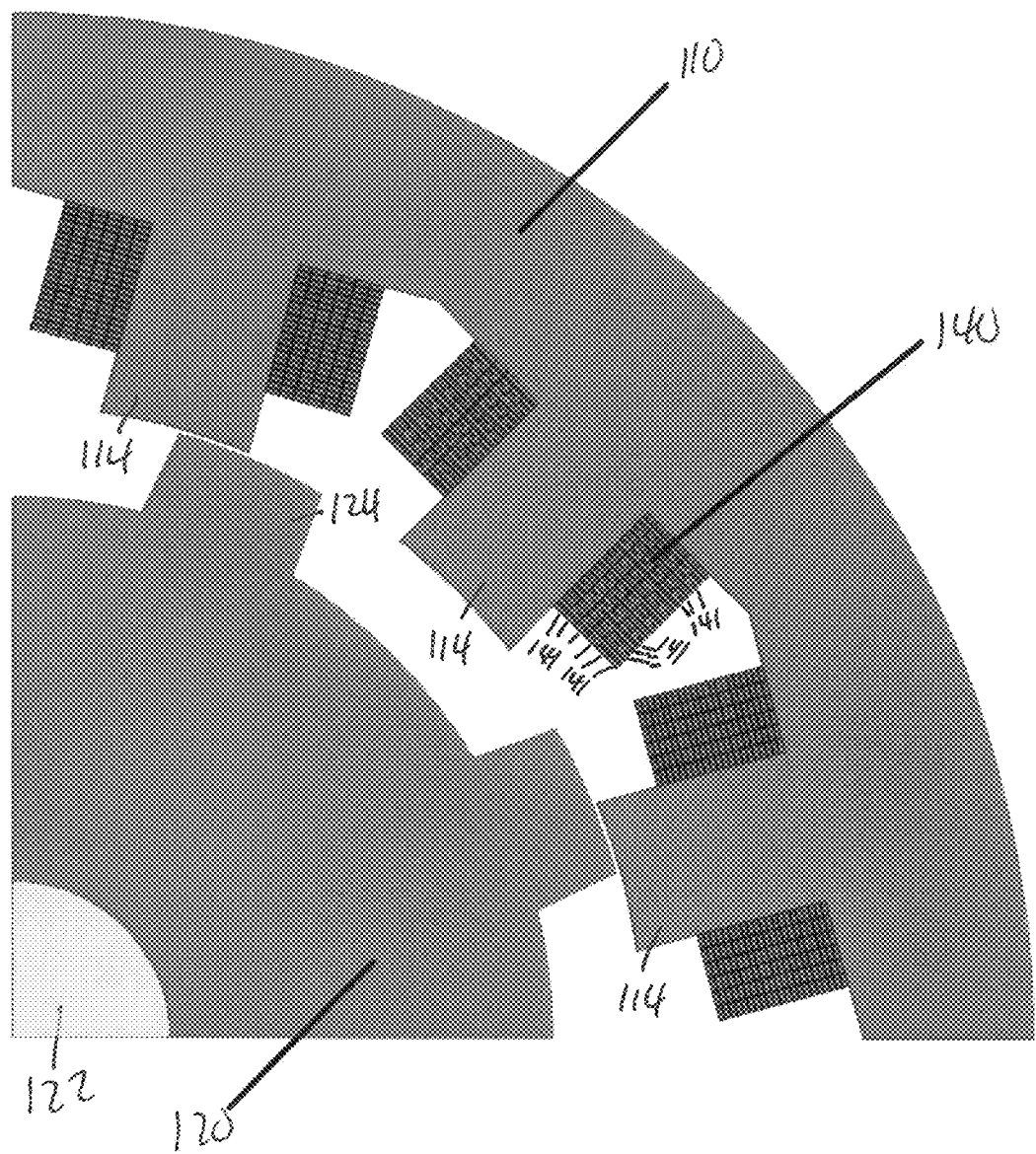
FIG. 12 is a cross-section view of a portion of the inner structure of a high-speed high-power switched reluctance machine showing discrete windings according to another example.
Figure 13:
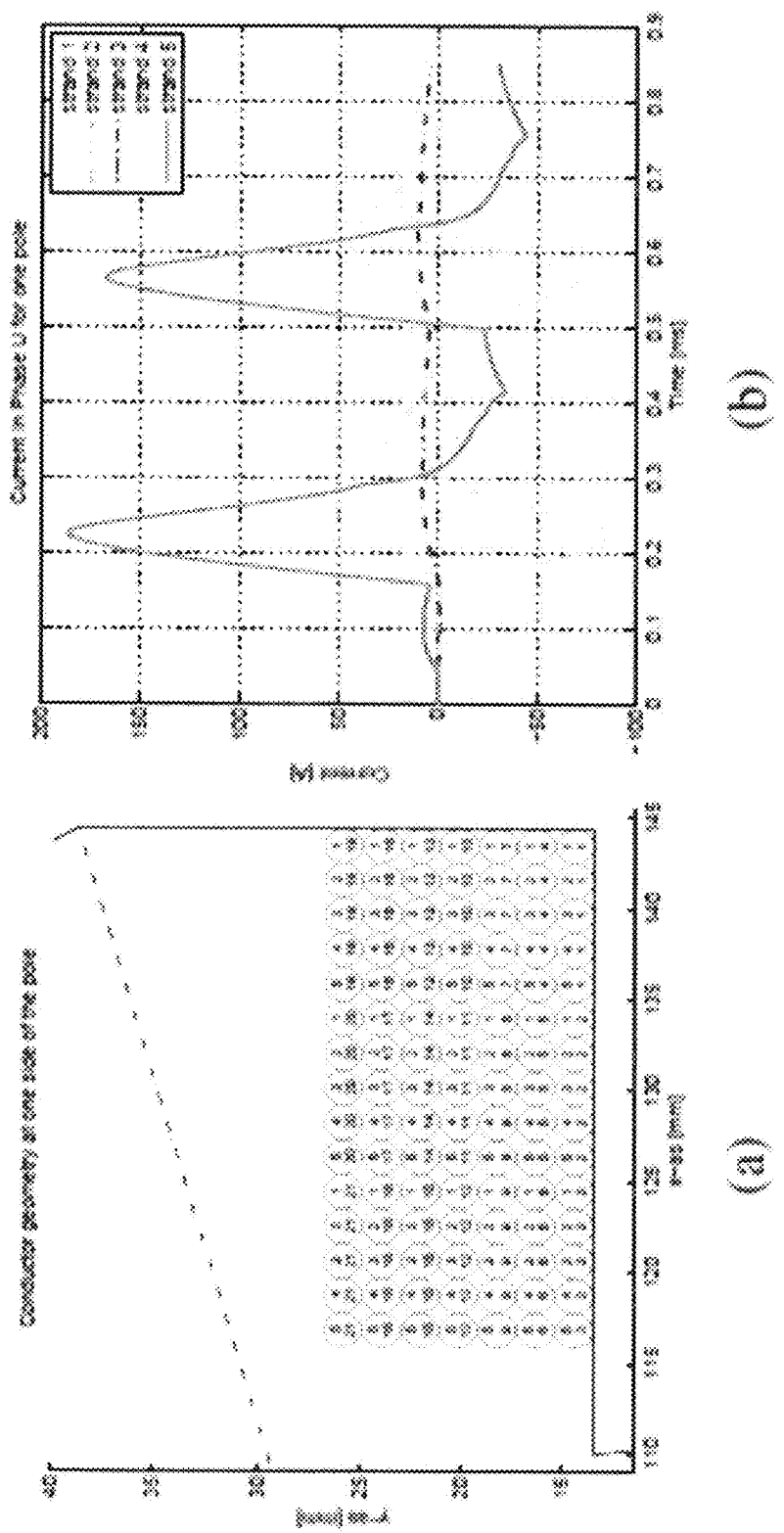
FIG. 13A is a schematic cross-section view of an example stator coil winding design.
FIG. 13B shows simulation results for current flow within the winding design of FIG. 13A.
FIG. 13C shows simulation results for magnetic flux lines within the winding design of FIG. 13A.
FIG. 13D shows simulation results for current density distribution within the winding design of FIG. 13A.
Figure 14:
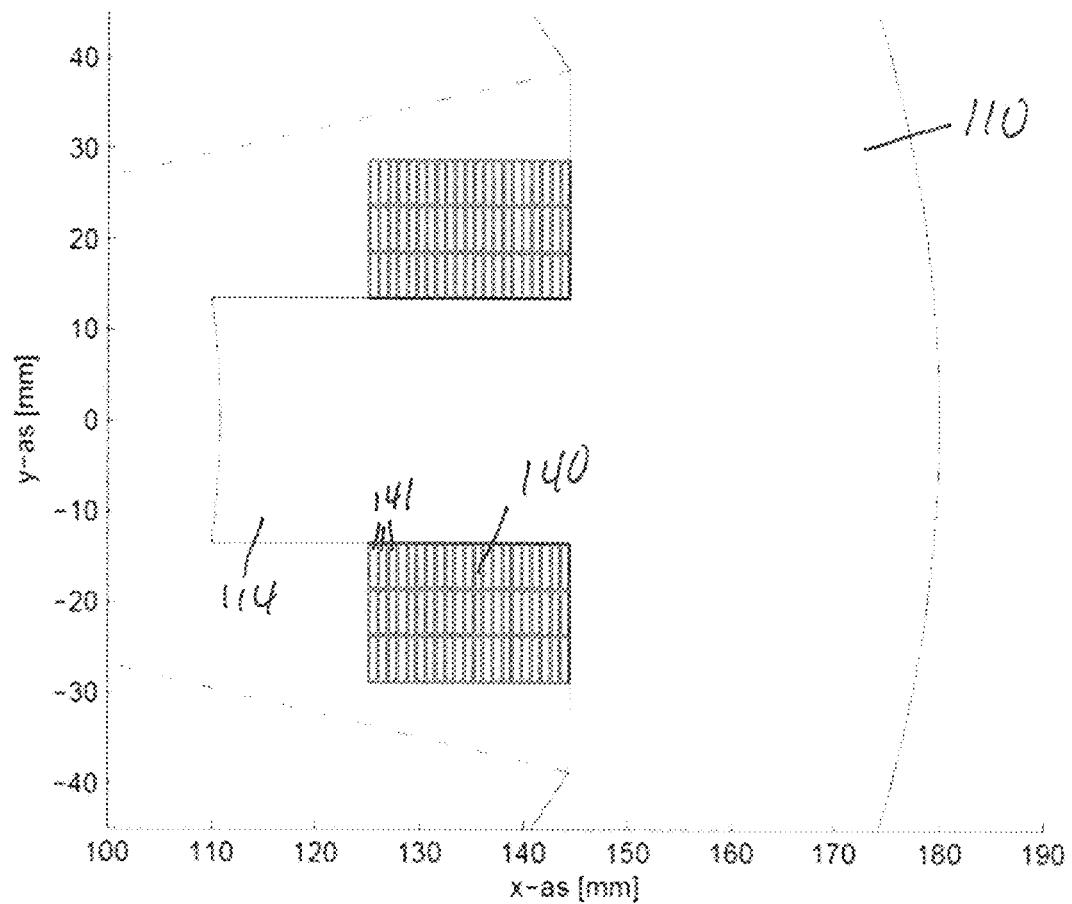
FIG. 14 is a schematic cross-section view of an example stator coil winding design for a high-speed high-power switched reluctance machine.

Turning to FIGS. 12 to 14, it has been determined that when designing a high-speed high-power SRM, having a higher slot fill factor, in conjunction with a low thermal resistance between stator coils and the stator core or frame is often important, in some cases significantly important, in order to achieve improved heat dissipation and, hence, high power density in a high-speed high-power SRM.

Typically, on high speed electric machines the copper loss (which may also be referred to as the power loss) is simply defined as $I^2R$ (where I is RMS current, and R is resistance), but on high frequency machines, such as a high-speed high-power SRM, a nonlinear term comes into play which is dictated by the magnetic fields in the machine.

Figure 13C:
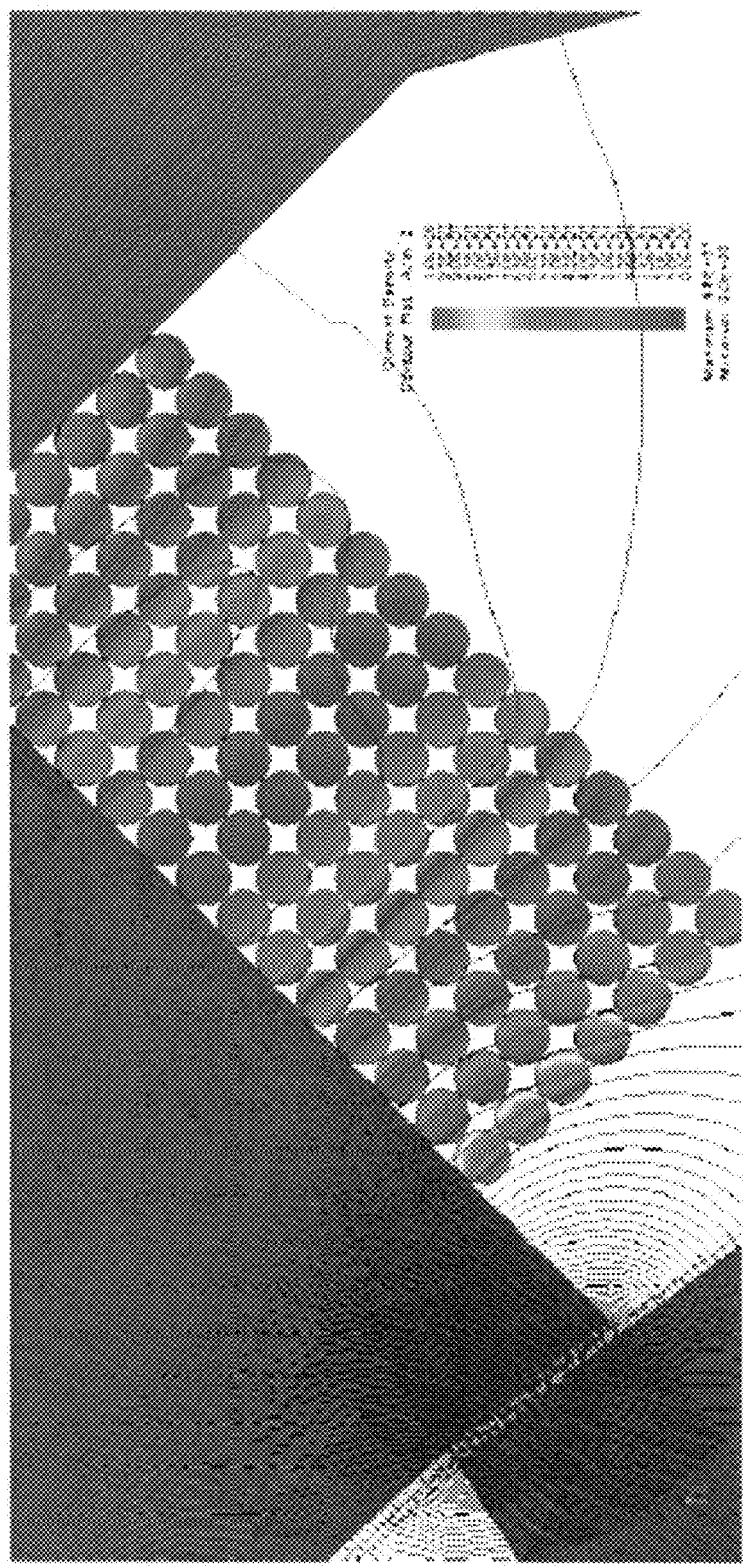
Figure 13D:
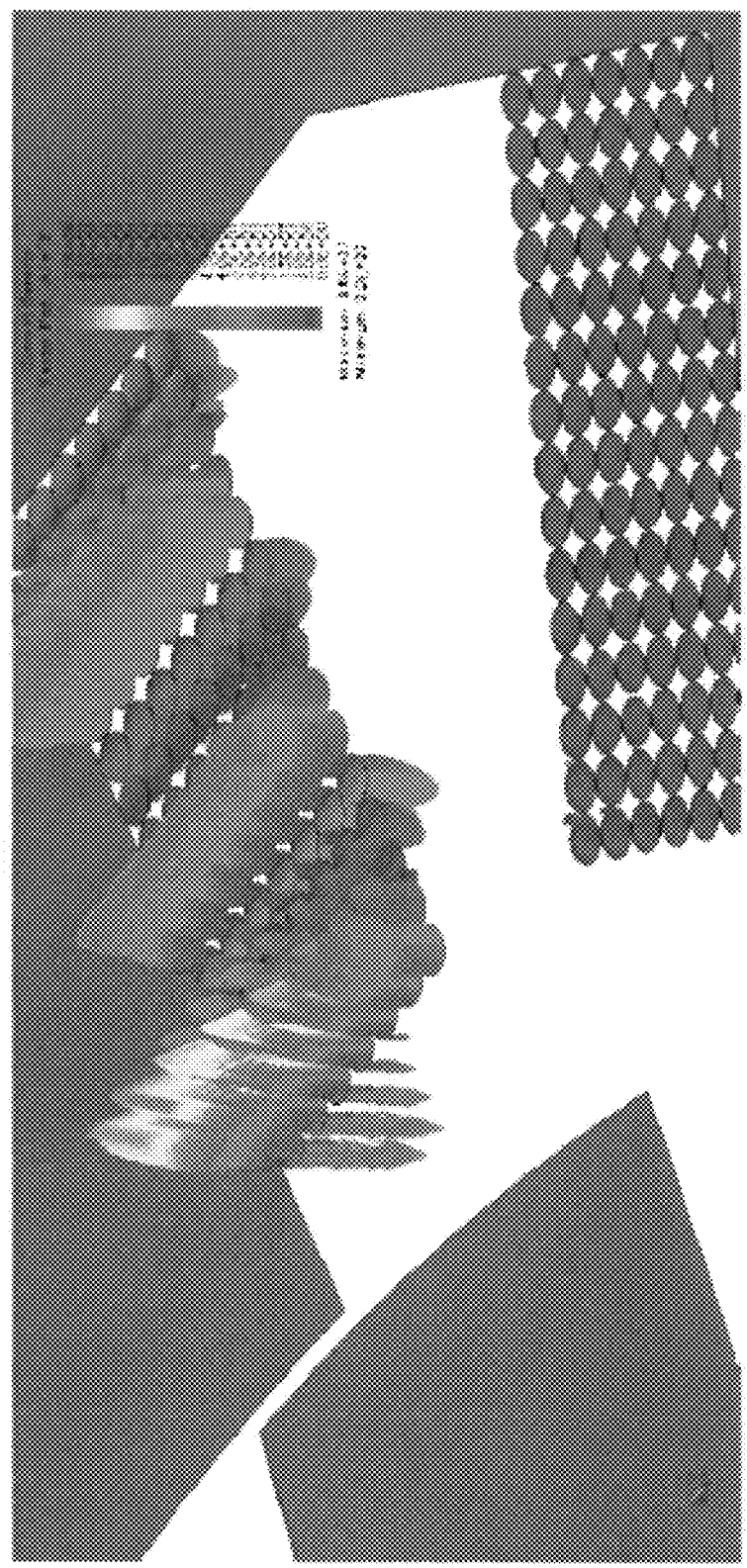

For example, looking at FIG. 13C, magnetic flux lines can be seen crossing over the windings. The effect of this may be significant; for example, looking at FIG. 13D, the current vectors are going both forwards and backwards at the same time. Ideally, the current should be unidirectional. Furthermore, by looking at FIG. 13B, one can see that the current is not evenly distributed over the windings, which means that certain wires will generate localized losses, and be more likely to fail prematurely.

One of the conclusions from research into the organization of windings in a SRM is that it is often preferable to compact the windings toward the top of the stator slot, as windings that are close to the rotor will generate more losses as can be seen by, for example, the density of the flux lines in FIG. 13C. Also, designing a SRM with the windings compacted toward the top of the stator slot may allow one or more axial cooling pipes (e.g. flow channels 212) between the stator coils and the rotor. Orienting the cooling pipes in such a fashion may allow one or more localized heat sources to be cooled using the same cooling system.

As shown in FIGS. 12 and 14, bar wire coils have been designed for high-speed high-power SRM 100. Unlike typical stranded coils (which have a generally circular cross-sectional shape), bar wire coils (which have a generally rectangular cross-sectional shape) have larger surface area per unit length. Because the conductors are rectangular, air between the conductors is reduced. (With round conductors, the space between the conductors is filled with air (which is an insulating material) which may negatively impact heat transfer and subsequently inhibit machine performance. However, during high frequency operation, the use of bar wire coils having a larger surface area per unit length with may increase the skin and proximity effect, leading to higher effective resistance and, thus, higher copper losses. For this reason, the cross sectional area of the bar wires, number of strands for the given rms current, the distance of the coils from the airgap and the orientation of the bar wires should be developed and/or optimized (e.g. through the use of computer-assisted modeling) in order to achieve designs having high fill factors and low copper losses. Finally, while SRM 100 has been designed with bar wires, in other embodiments a high-speed high-power SRM may be constructed using stranded wires.

Performance Parameters

Figure 15:
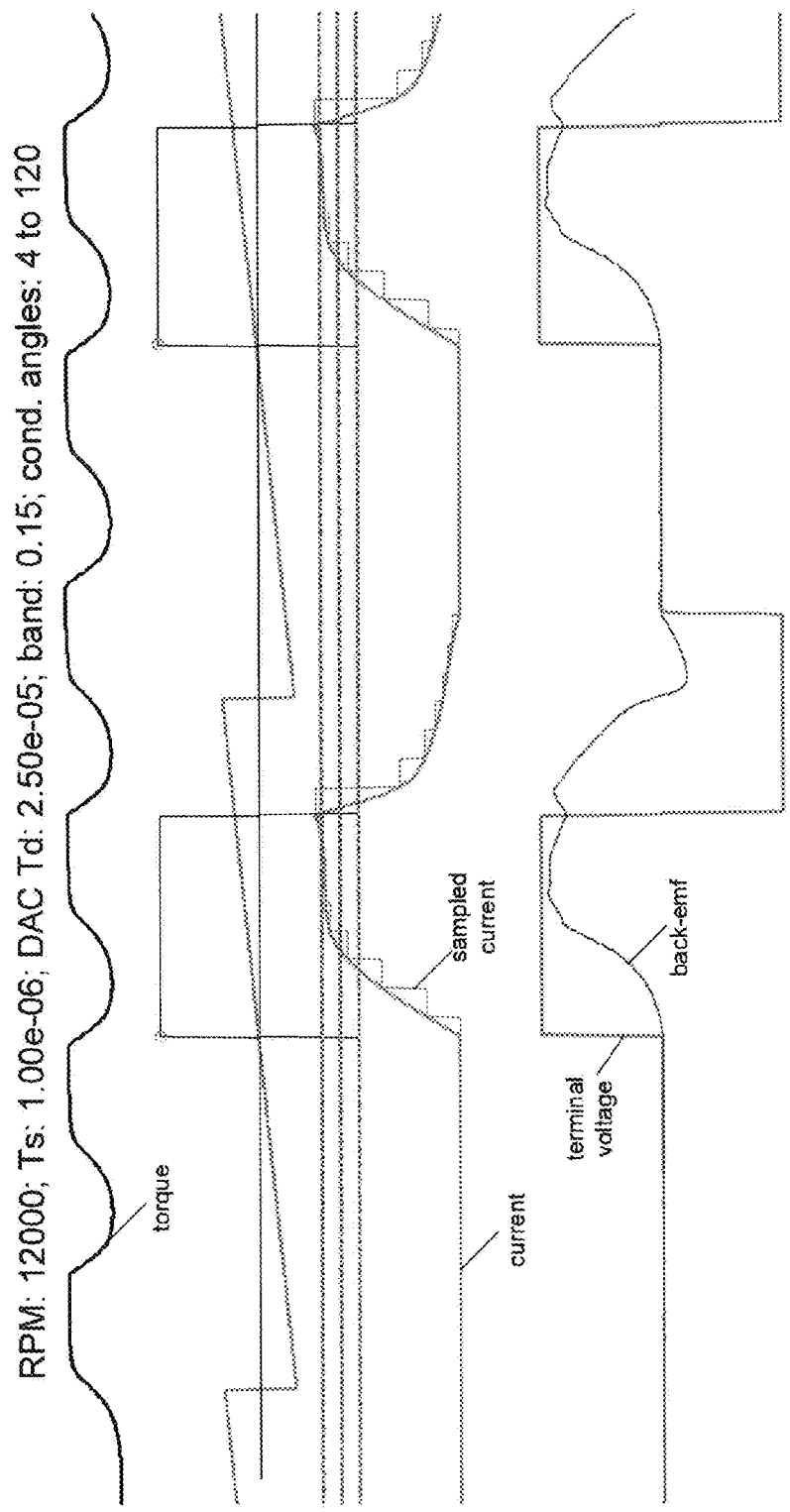
FIG. 15 shows simulation results for analysis conducted to define controller parameters for a switched reluctance machine.

For a high-speed high-power SRM, the torque-speed curve, torque ripple, and efficiency profile of the machine are often considered important performance parameters, particularly in traction motor applications. When operating at high speeds, the rate of change of flux linkage in a high-speed high-power SRM is typically much higher than the DC-link voltage. For this reason, the conduction angles of SRM 100 have been developed and/or optimized for different torque and speed points to deliver high (preferably the maximum) torque with low (preferably the lowest) torque ripple. In lower speed operation, in addition to conduction angle, the hysteresis band may also be developed and/or optimized by considering the maximum switching frequency that the converter designed for high-speed high-power SRM can achieve and the minimum sampling time that the current controller can provide. An example of such a development process is shown in FIG. 15 for one of the operating points of SRM 100.

Figure 16A:
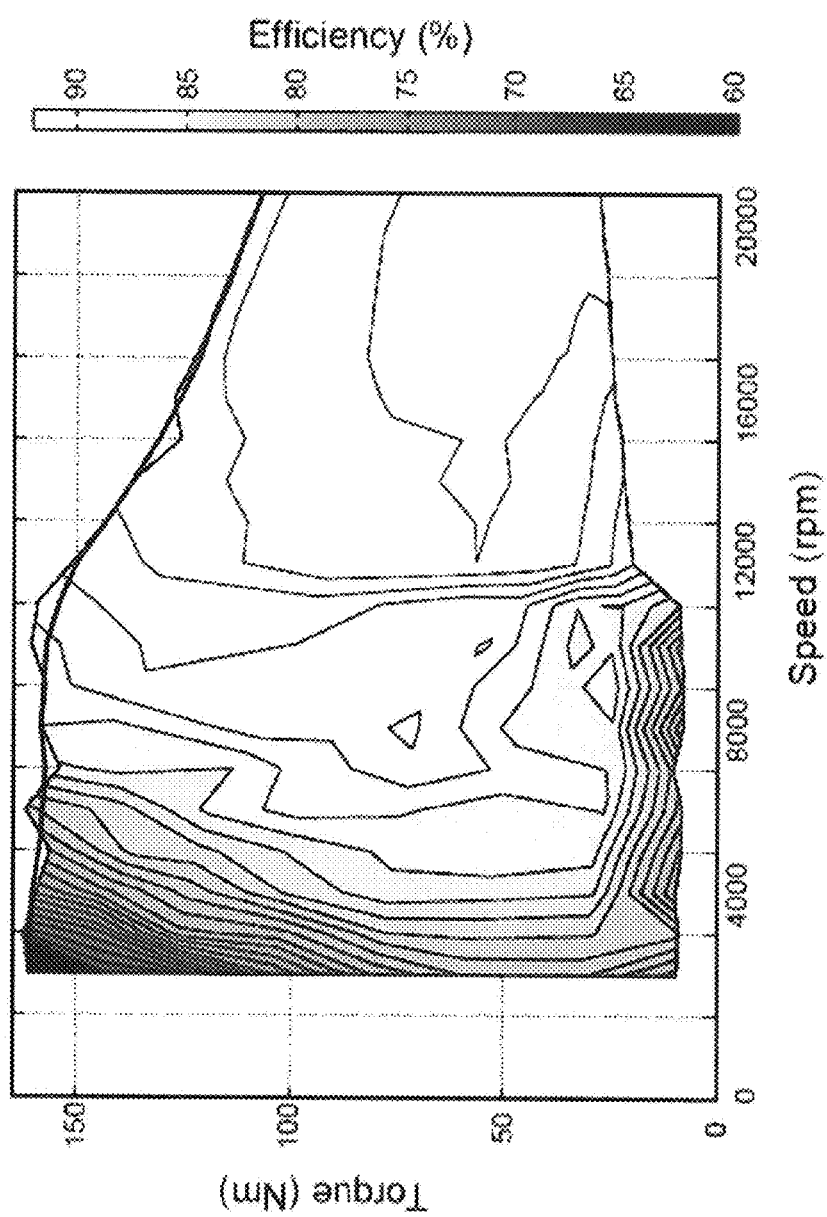
FIG. 16A shows simulation results for the efficiency of a high-speed high-power switched reluctance machine.
Figure 16B:
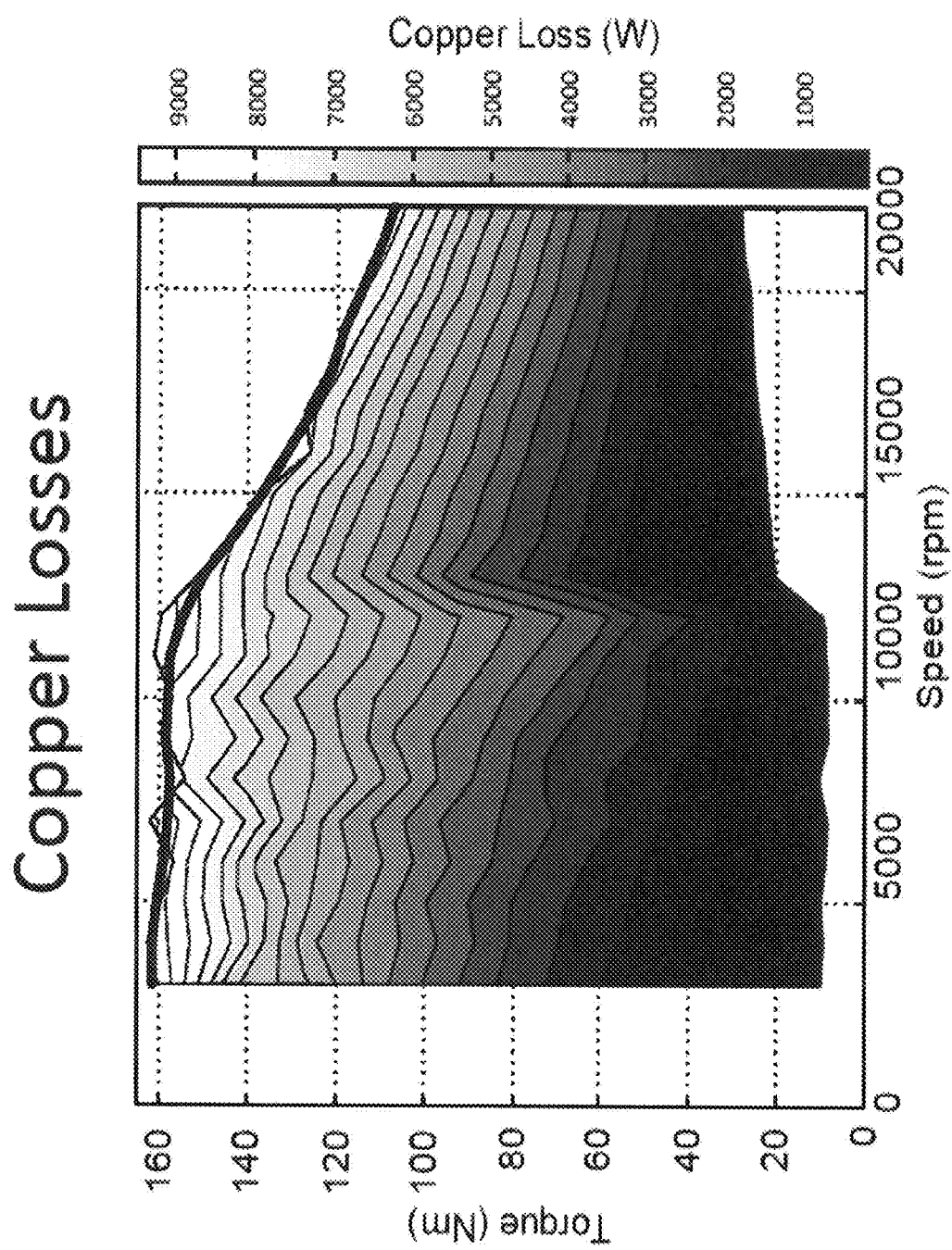
FIG. 16B shows simulation results for the copper losses of a high-speed high-power switched reluctance machine.
Figure 16C:
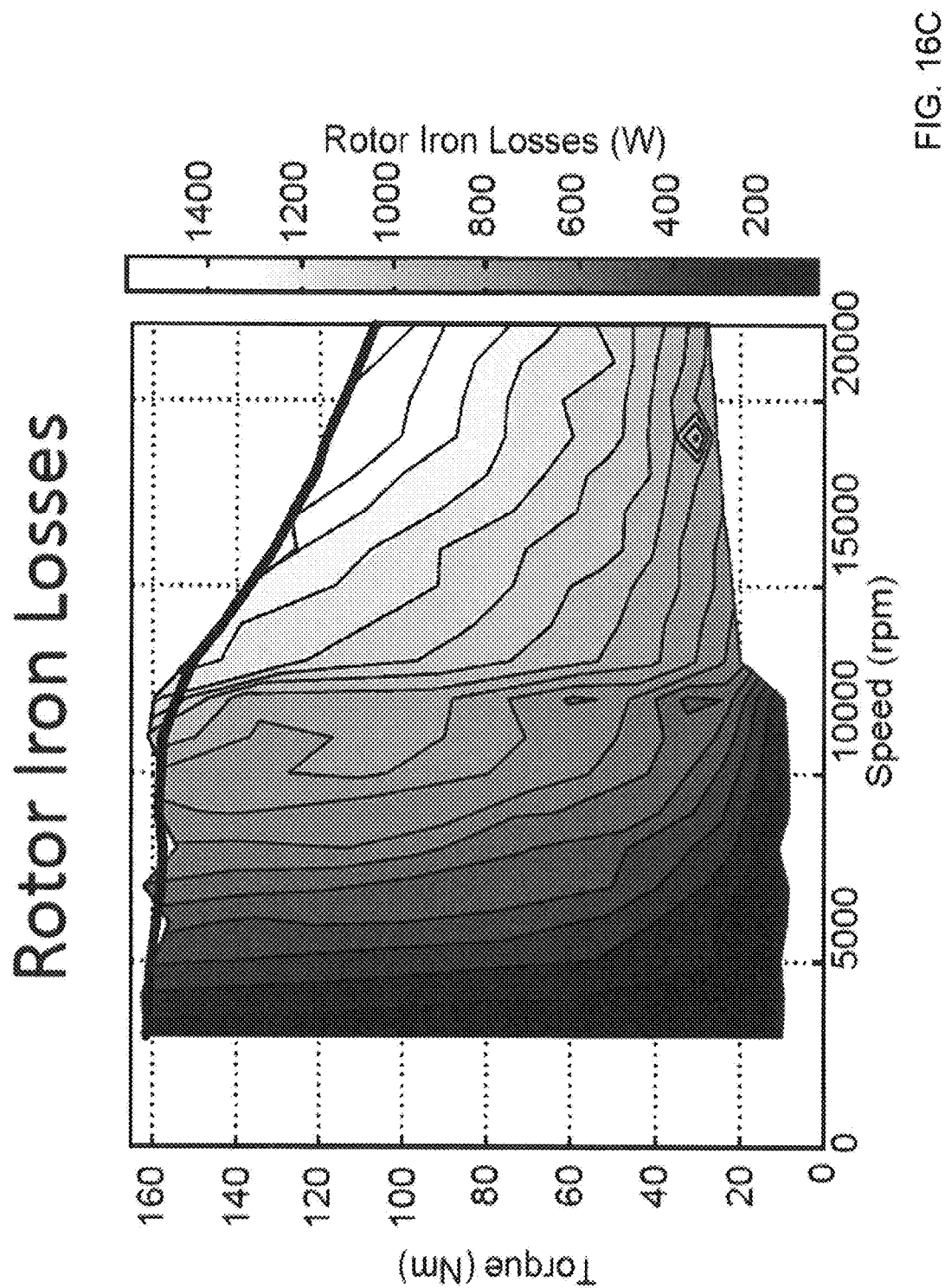
FIG. 16C shows simulation results for the rotor iron losses of a high-speed high-power switched reluctance machine.
Figure 16D:
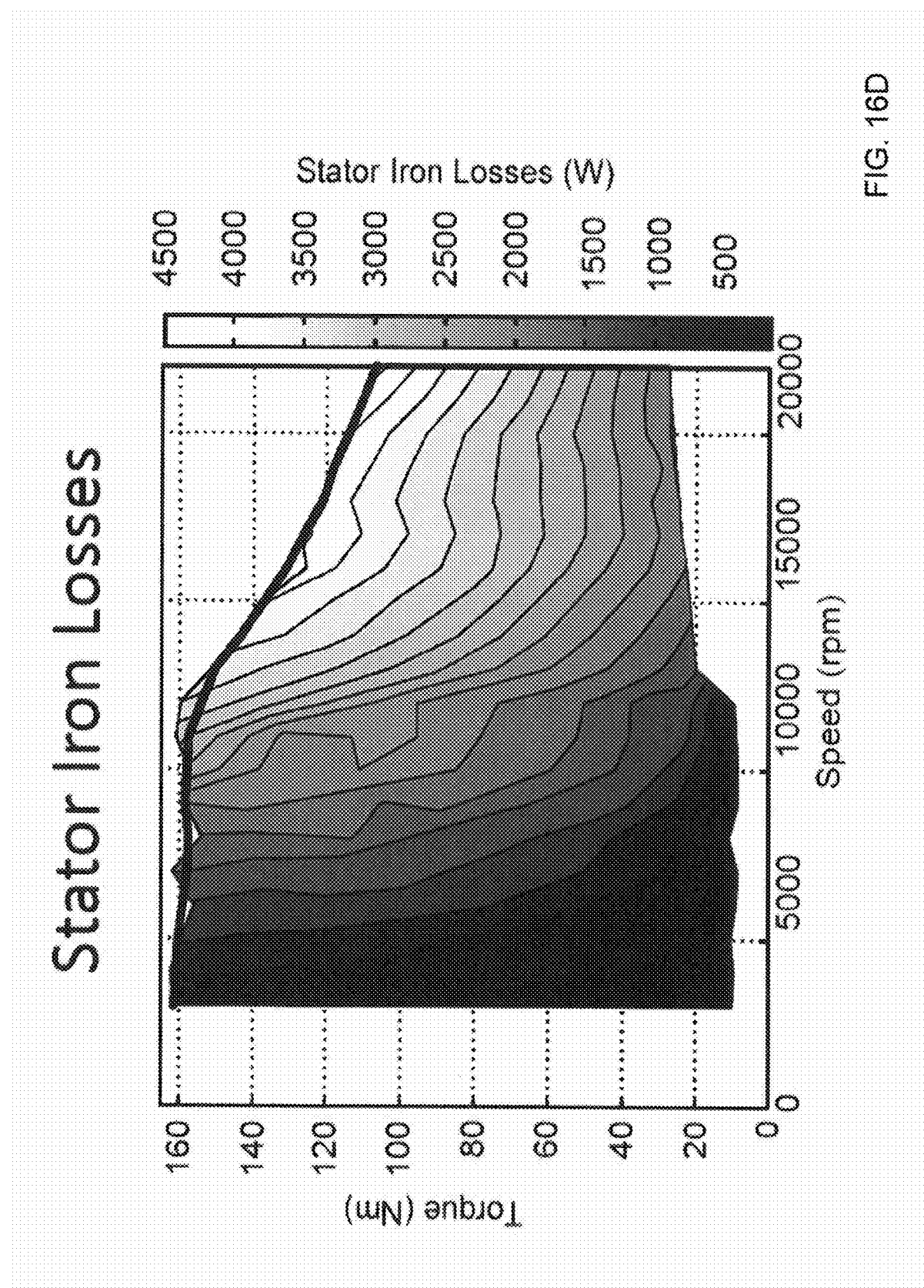
FIG. 16D shows simulation results for the stator iron losses of a high-speed high-power switched reluctance machine.

Further performance parameters calculated for SRM 100 are shown in FIGS. 16A to 16G. These losses charts were gathered via electromagnetic FEA and considerable optimization analysis. The overall magnetic efficiency map shown in FIG. 16A is the sum of the charts shown in FIGS. 16B to 16D (i.e. the sum of copper losses, rotor iron losses, and stator iron losses).

Figure 16E:
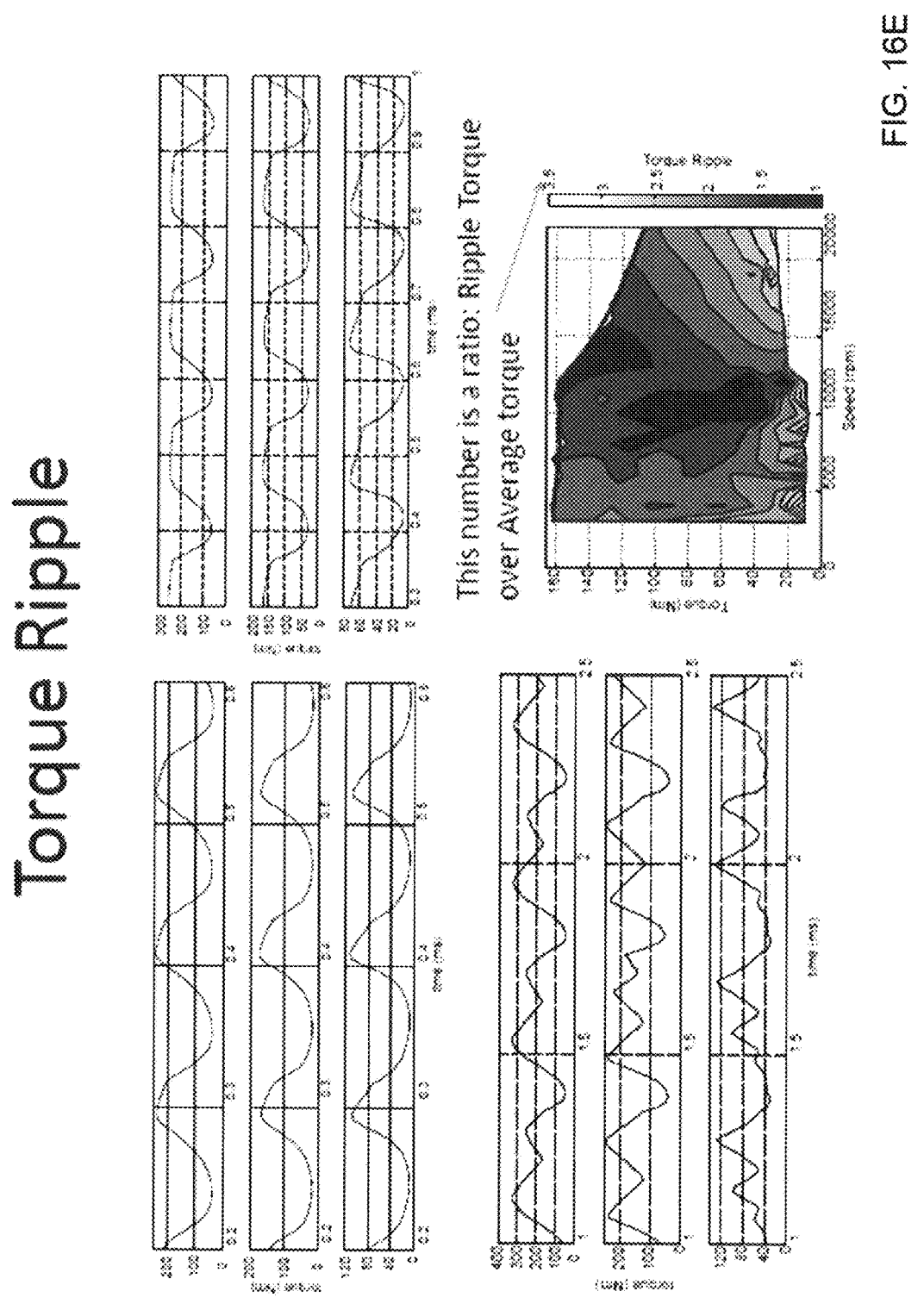

As show in FIG. 16E, in some embodiments, there may be significant torque ripple, even after optimization, which indicates the importance of ensuring that the design is optimized as much as possible.

Figure 16F:
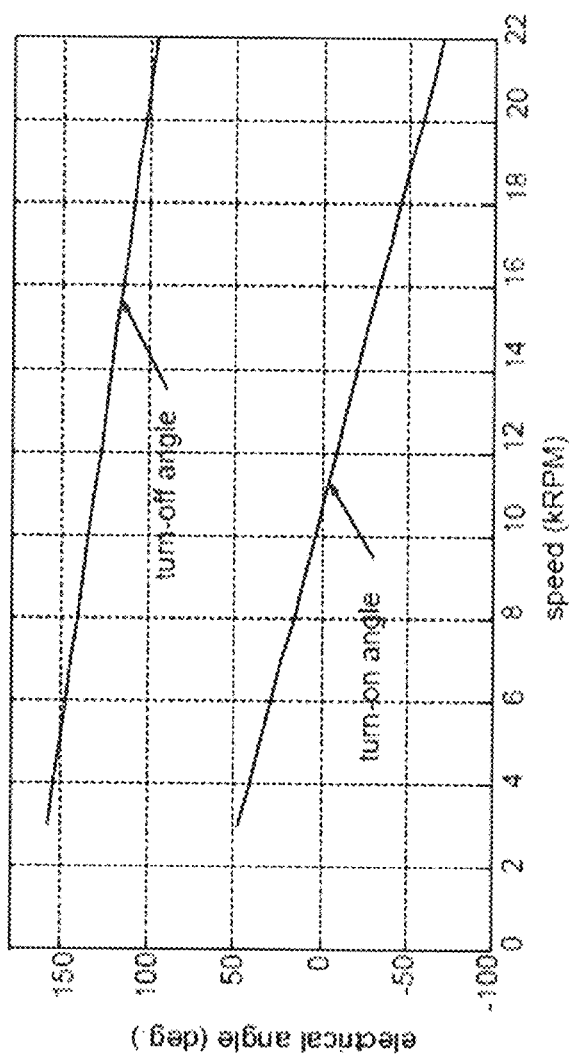
FIG. 16F shows simulation results for peak conduction angles for a high-speed high-power switched reluctance machine.

FIG. 16F shows the simple control parameters expected to yield the efficiency map shown in FIG. 16A and the torque ripple map shown in FIG. 16E.

Figure 16G:
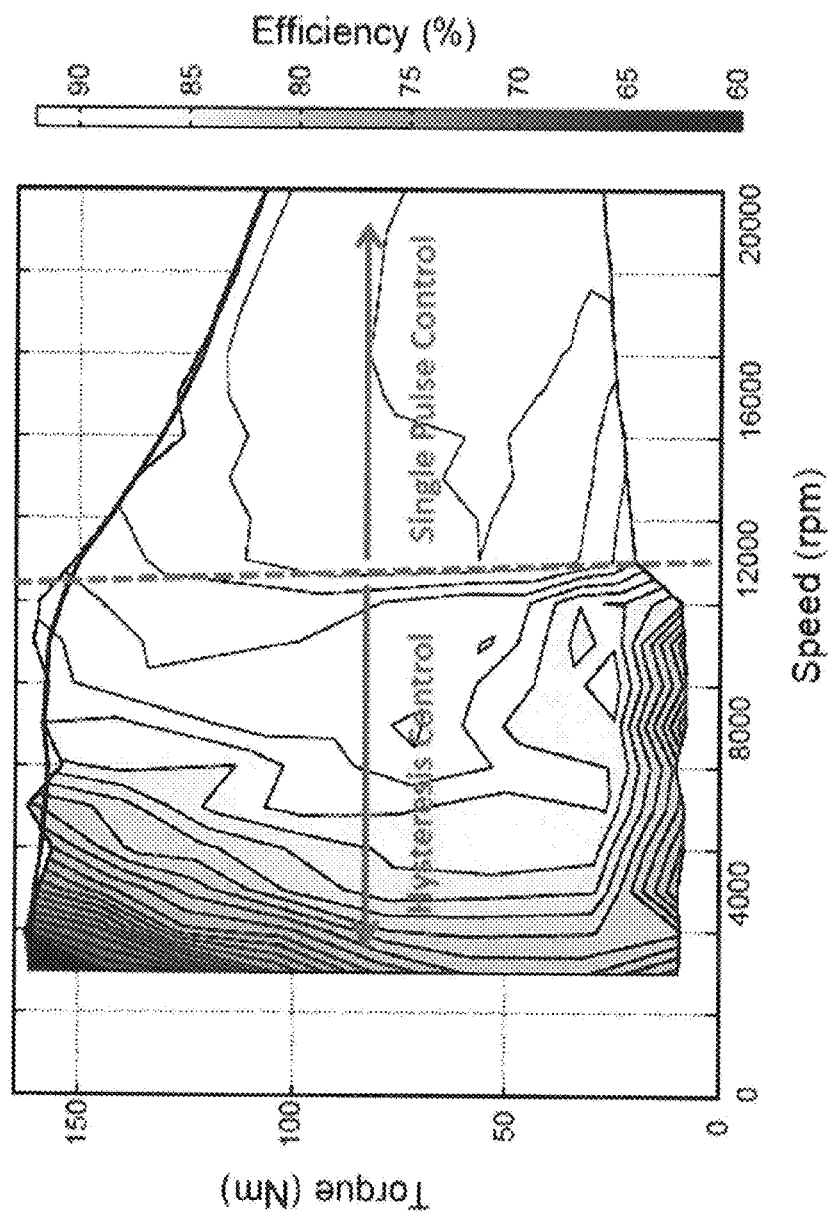
FIG. 16G shows simulation results for the efficiency of different control modes for a high-speed high-power switched reluctance machine.

FIG. 16G shows the two control modes which exist on SRM 100. There are 3 traditional types of control modes, hover the third control mode is not employed in SRM 100 because it generally has relatively low efficiency.

Noise and Vibration

In noise analysis, the typical goal is to minimize sound production. In practice, this is often accomplished by avoiding resonant frequencies. Resonant frequencies exist in any physical object. Any oscillating force or torque can excite a resonant frequency. Resonant frequencies are theorized to exist at all times when a force is applied to the object. Even though all resonating frequencies may exist at any given time, the loudness may not be very large. This is because the exciting force(s) may not be at the same frequency as the object's resonant frequencies. If the excitation frequency matches the resonant frequency, unnecessarily loud behavior can result.

In order to reduce noise and vibration in high-speed high-power SRM 100, the size and the dimensions of the ribbed frame may be developed and/or optimized based on the harmonic content of the radial forces in the airgap. For example, the machine geometry may be modified such that the resonant frequency does not match the excitation frequency in order to minimize the sound produced.

Figure 18:
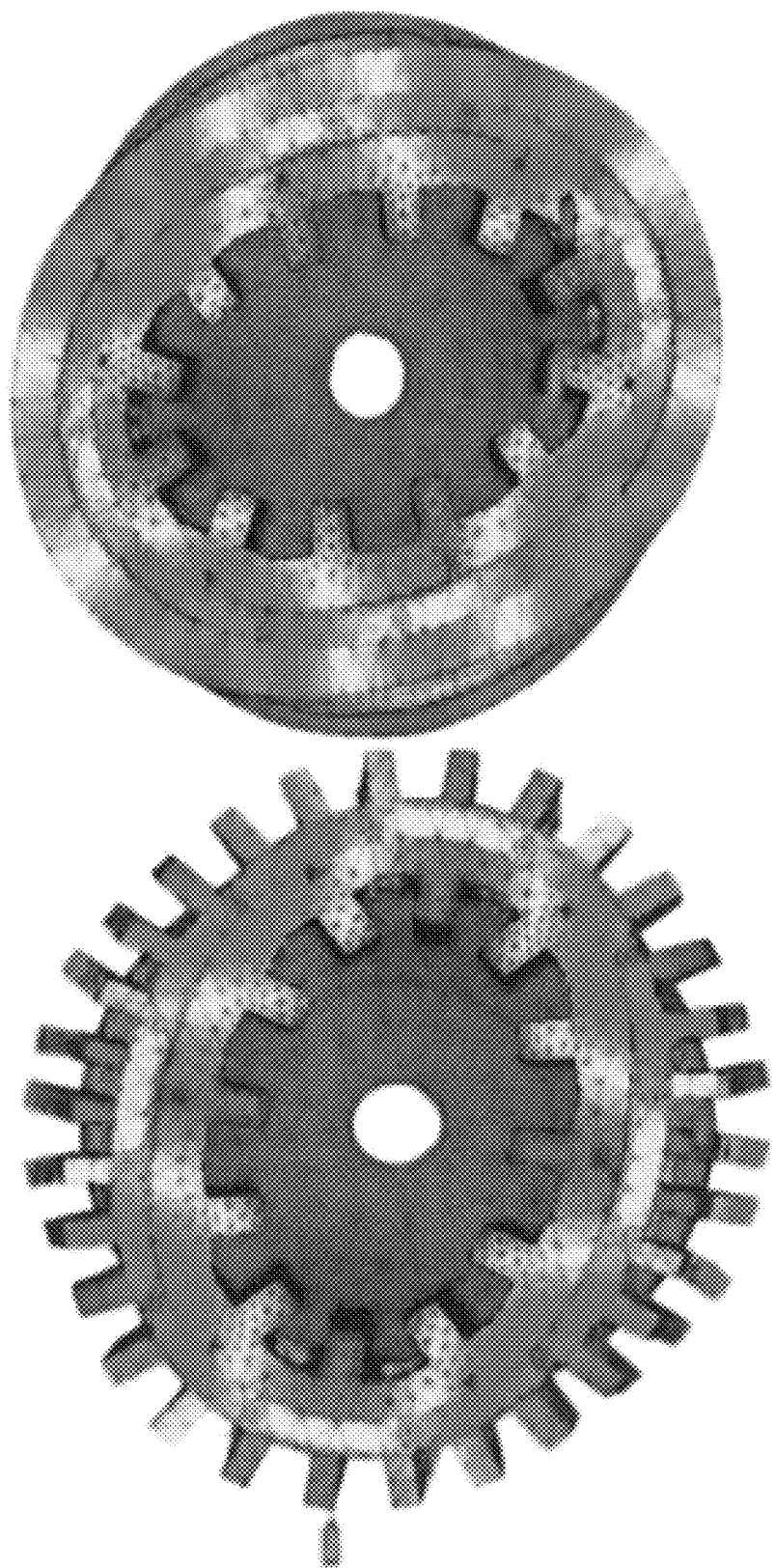
FIG. 18 shows example simulation results for a vibration analysis of a high-speed high-power switched reluctance machine.

For example, the size, shape and direction of cooling fins 112 and the resulting impact on the resonant frequency was investigated during the development of SRM 100. FIG. 17 illustrates example frame/rib designs, and FIG. 18 illustrates example simulation results for the noise expected to be generated by SRM 100 during operation. Resonant frequencies and corresponding mode shapes were analyzed (see e.g. FIG. 20), so that excitation due to airgap forces has reduced, and preferably minimized, subsequent noise production.

Vibrations analysis is similar to noise analysis. Again, it is preferable that the exciting forces and the resonating frequencies not match. This may be particularly important on shafts of high speed motors, such as SRM 100, because the vibrations can cause self-destruction and avoiding resonances can be difficult. FIG. 18 illustrates example simulation results for expected stress in shaft 122 due to rotationally induced vibrations.

Figure 19:
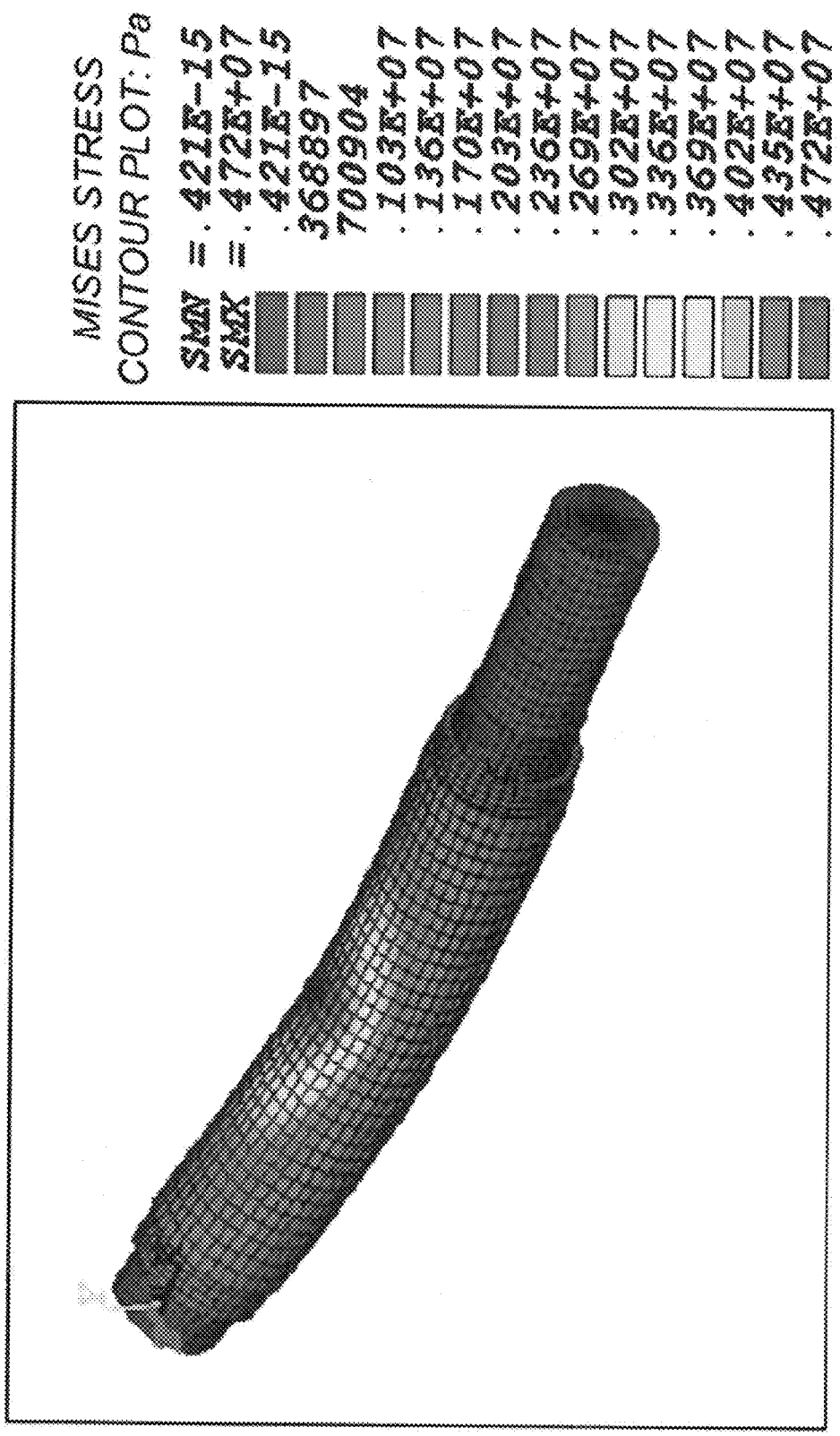
FIG. 19 shows example simulation results for a vibration analysis of the shaft of a high-speed high-power switched reluctance machine.
Figure 20:
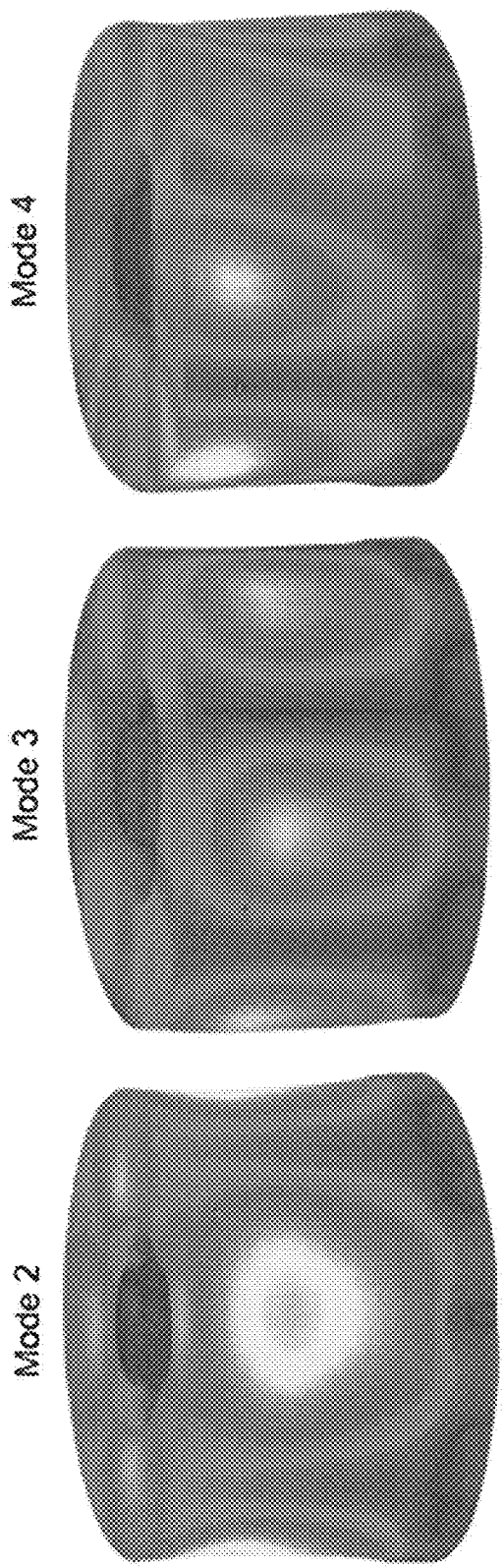
FIG. 20 shows example simulation results for a displacement analysis of the stator and frame of a high-speed high-power switched reluctance machine for different operating modes.

Preferably, the design of the frame 110 is developed and/or optimized through the use of noise, vibration, and harshness (NVH) analyses, including computer-assisted modeling (see e.g. FIGS. 18 to 20 for example output from such analysis). In general, the basic idea is to shift the mode frequencies so that they avoid matching with excitation frequencies such as shaft rotation or magnetic excitation. Shifting the mode is again a function of the material properties and geometry of the structure. As it may not be practical or possible, to significantly vary the material properties, it may be preferable to focus on changing the geometry of the SRM. Additionally, in some cases certain design features (e.g. flanges extending from the machine, such as cooling ribs 112) may unexpectedly produce a significant amount of noise during operation of SRM 100. Noise analysis can help identify those issues.

Rotor Interpolar Filler

Figure 21:
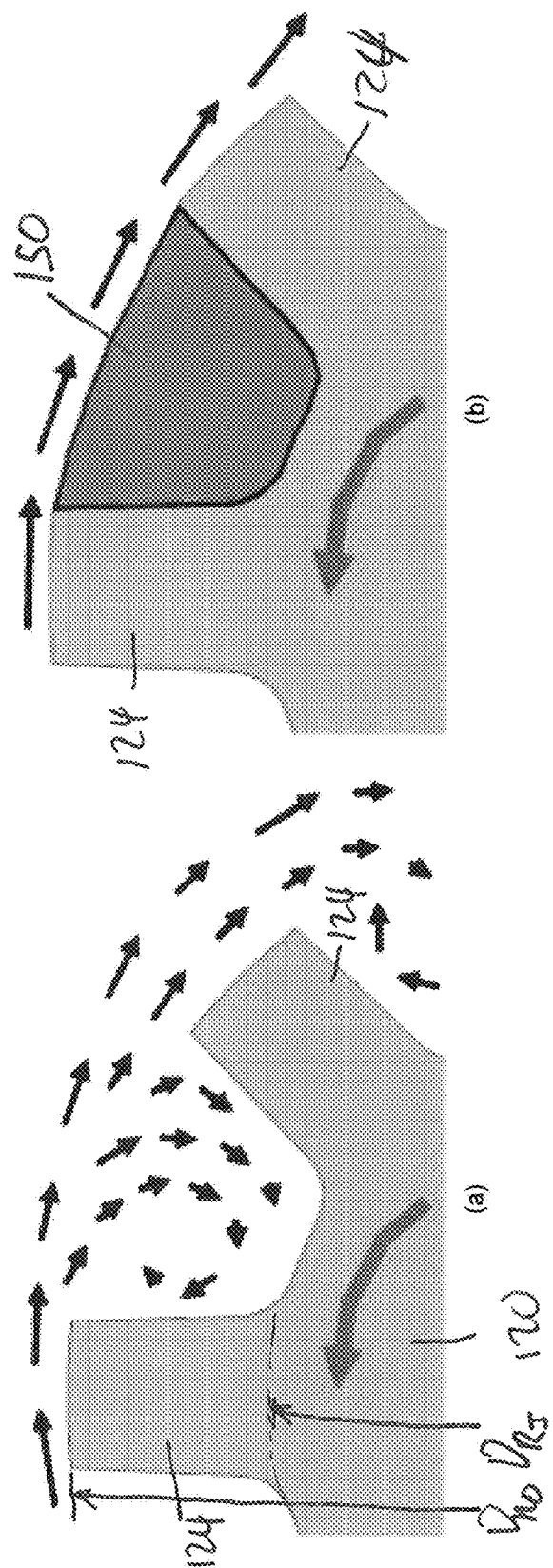
FIG. 21A is a schematic cross-section view of a rotor, showing an example of air flow over a rotor without interpolar filler.
FIG. 21B is a schematic cross-section view of a rotor, showing an example of air flow over a rotor with interpolar filler.

As shown in FIG. 21A, a typical SRM has an inner rotor diameter $D_{RI}$ and a plurality of rotor poles 124 extending radially from the inner rotor diameter, the distal ends of the rotor poles defining an outer rotor diameter $D_{RO}$. When rotating at high speed, the poles 124 create a drag force which results in aerodynamic losses, which may be significant for large rotor diameters and/or at higher operating speeds. For example, for a SRM having the same parameters as SRM 100, experimental results published by NASA indicate that the loss on the machine due to air friction for a cogged rotor (e.g. as shown in FIG. 21A) will be on the order of 8 kW, whereas for a cylindrical rotor (e.g. as shown in FIG. 21B) the air friction losses will be on the order of 2 kW. This extra energy will turn into heat, which has to be removed by the cooling system(s). Thus there is incentive to reduce these losses if possible.

Figure 22A:
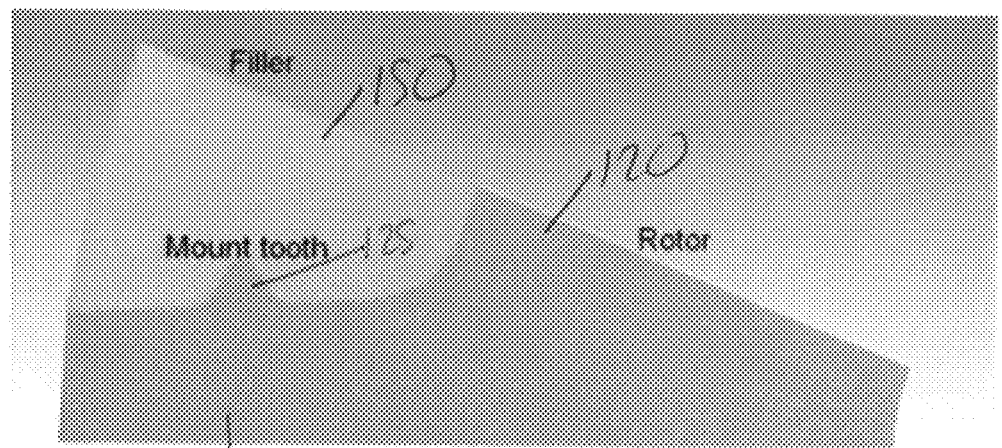
FIG. 22A is a schematic cross-section view of an example rotor pole structure configured to assist in securing interpolar filler for a high-speed high-power switched reluctance machine.
Figure 22B:
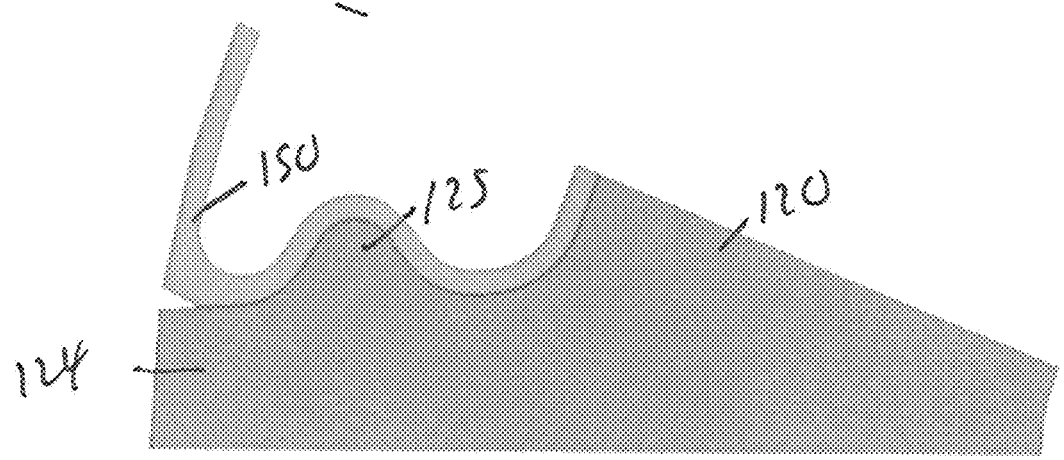
FIG. 22B is a schematic cross-section view of another example rotor pole structure configured to assist in securing interpolar filler for a high-speed high-power switched reluctance machine.
Figure 22C:
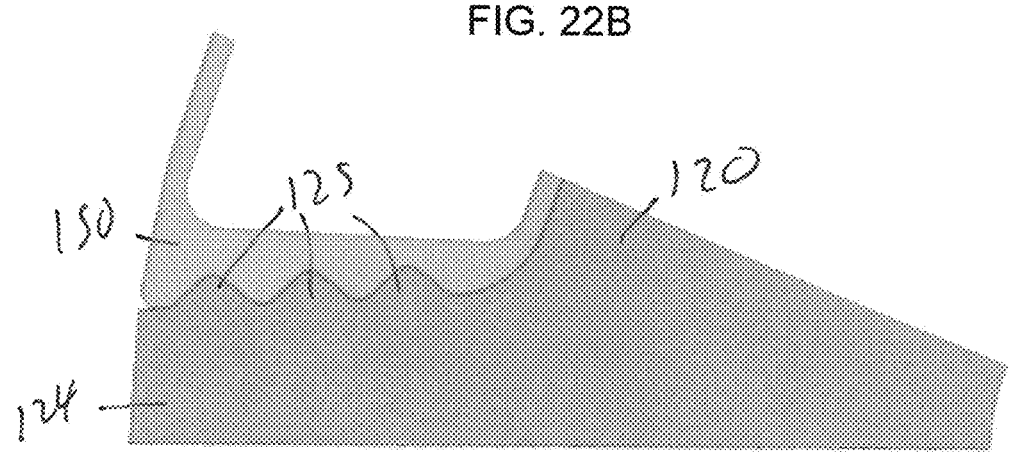
FIG. 22C is a schematic cross-section view of another example rotor pole structure configured to assist in securing interpolar filler for a high-speed high-power switched reluctance machine.

This drag force may be reduced by filling the areas in between the poles. As shown in FIG. 21B, an interpolar filler material 150 may be used to turn the rotor into a cylindrical structure, and thereby reduce the aerodynamic losses. The interpolar filling material 150 is secured to the rotor 120 to prevent the material 150 from flying radially outwardly during high speed operation of SRM 100. To assist in retaining interpolar filling material 150 within the outer rotor diameter $D_{RO}$, as illustrated in FIGS. 22A to 22C, one or more protrusions or teeth 125 may be provided on the sides of rotor poles 124. The teeth 125 assist in holding the filler material 150 as the centrifugal force attempts to launch them out of the rotor. The number and shape of the tooth may be developed and/or optimized so that the electromagnetic characteristics of the motor are not affected and, also, so that the expected stresses on the teeth 125 and on the filler material 150 are lower than the yield strength of the electrical steel of the rotor and of the filler material, respectively. Materials investigated for use as filler material 150 include high performance plastics and carbon fiber.

Converter

Figure 23:
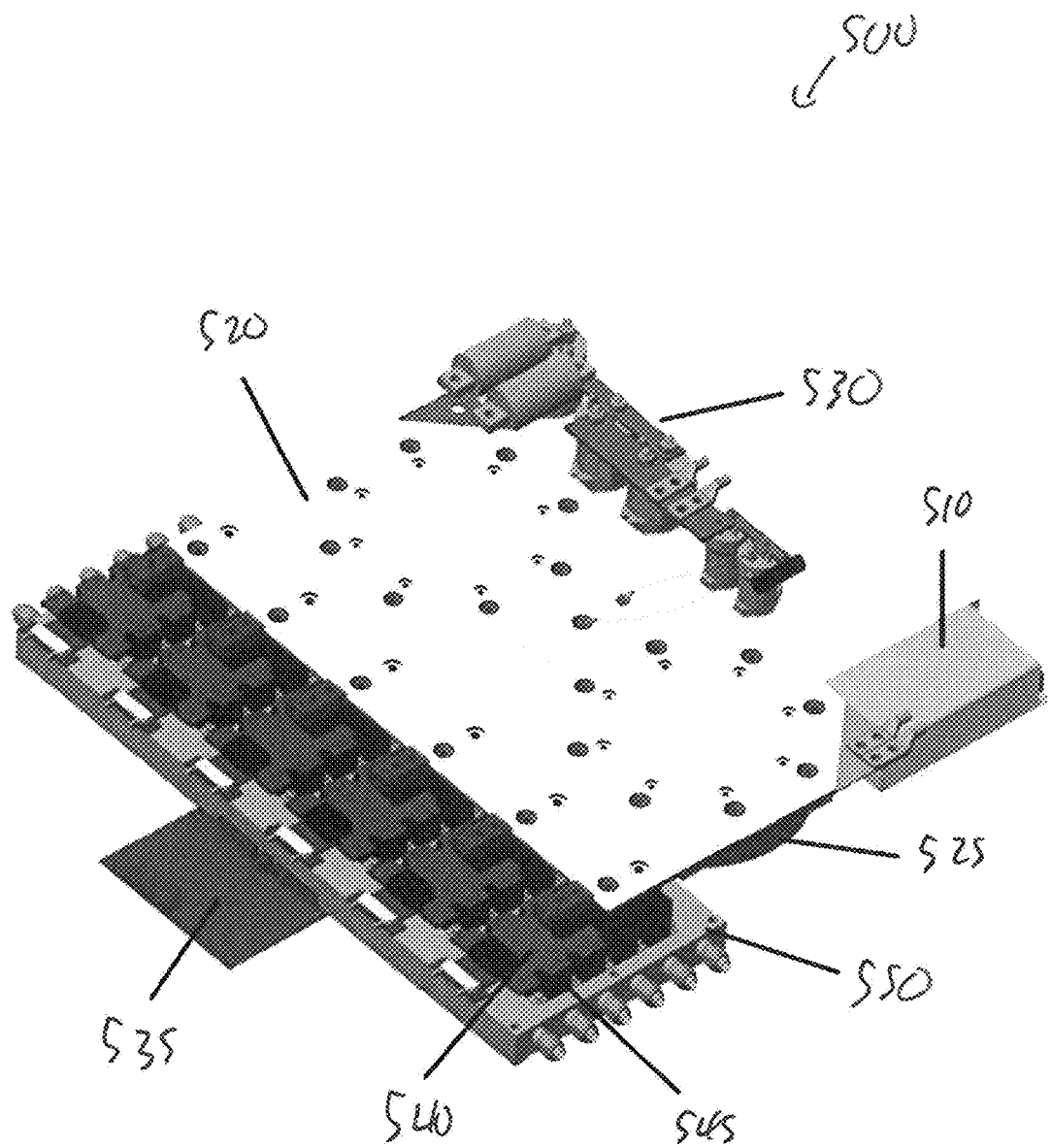
FIG. 23 is a perspective view of a power convertor for a high-speed high-power switched reluctance machine.
Figure 24:
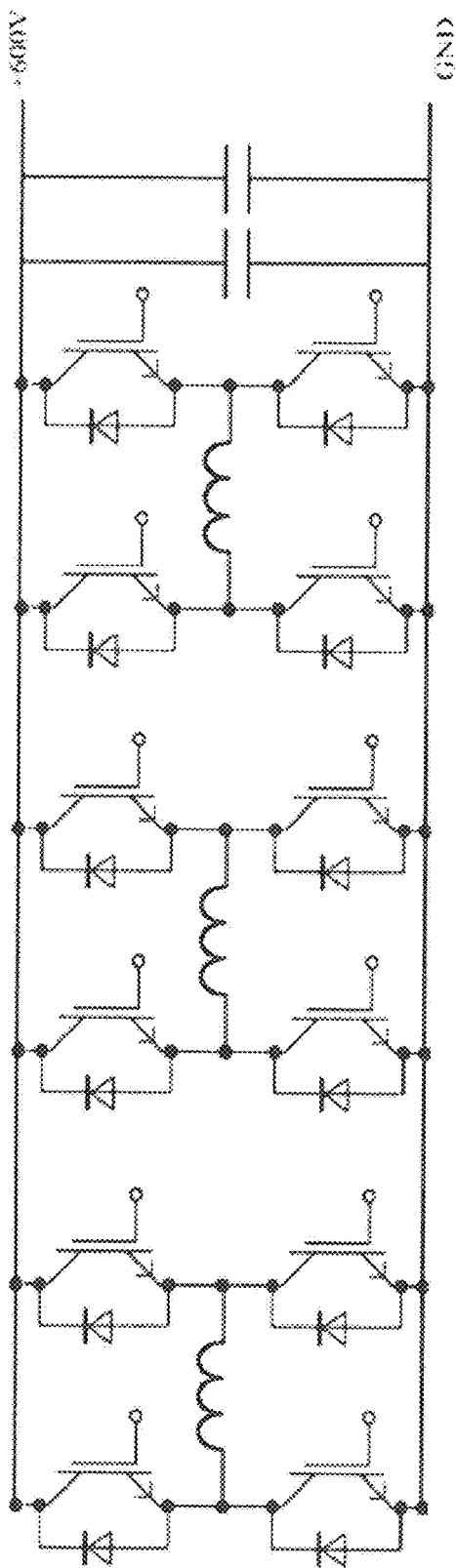
FIG. 24 is a circuit diagram for the power convertor of FIG. 23.

Turning to FIGS. 23 and 24, a converter, shown generally as 500, has been designed for the high-speed high-power SRM 100. Converter 500 includes a power supply 510, a busbar 520, a capacitor 525, a charge/discharge circuit 530, a control board 535, gate drivers 540, power modules 545, and a heat exchanger 550.

The busbar structure, switching devices, and heat exchanger have been designed for the high power and high frequency operation of SRM 100. The switching and conduction losses have been analyzed carefully for different operating points. The DC-link capacitors are sized to handle the ripple of the high-crest-factor current at high speeds. The heat exchanger is made of aluminum, and includes six counter flow channels located underneath the hotspot on the power modules.

FIG. 24 shows a "full-h" bridge, in which two transistors and two diodes are provided in each power module. Therefore, six power modules are required to make this circuit. This circuit may be used instead of an asymmetric bridge circuit (which is standard for SRMs) as an asymmetric bridge circuit may be more difficult to build due to, e.g., power module availability issues.

Test Stand

One of the challenges in testing and calibration of the high-speed high-power SRM 100 is that, when using conventional machines as a dynamometer, a high speed gearbox and 150 kW load is required. Another option is to use a directly coupled dynamometer, which can operate in similar conditions as the high-speed high-power SRM 100. Considering its unique structure, it is difficult to find an off the shelf dynamometer machine compatible with SRM 100.

Figure 25:
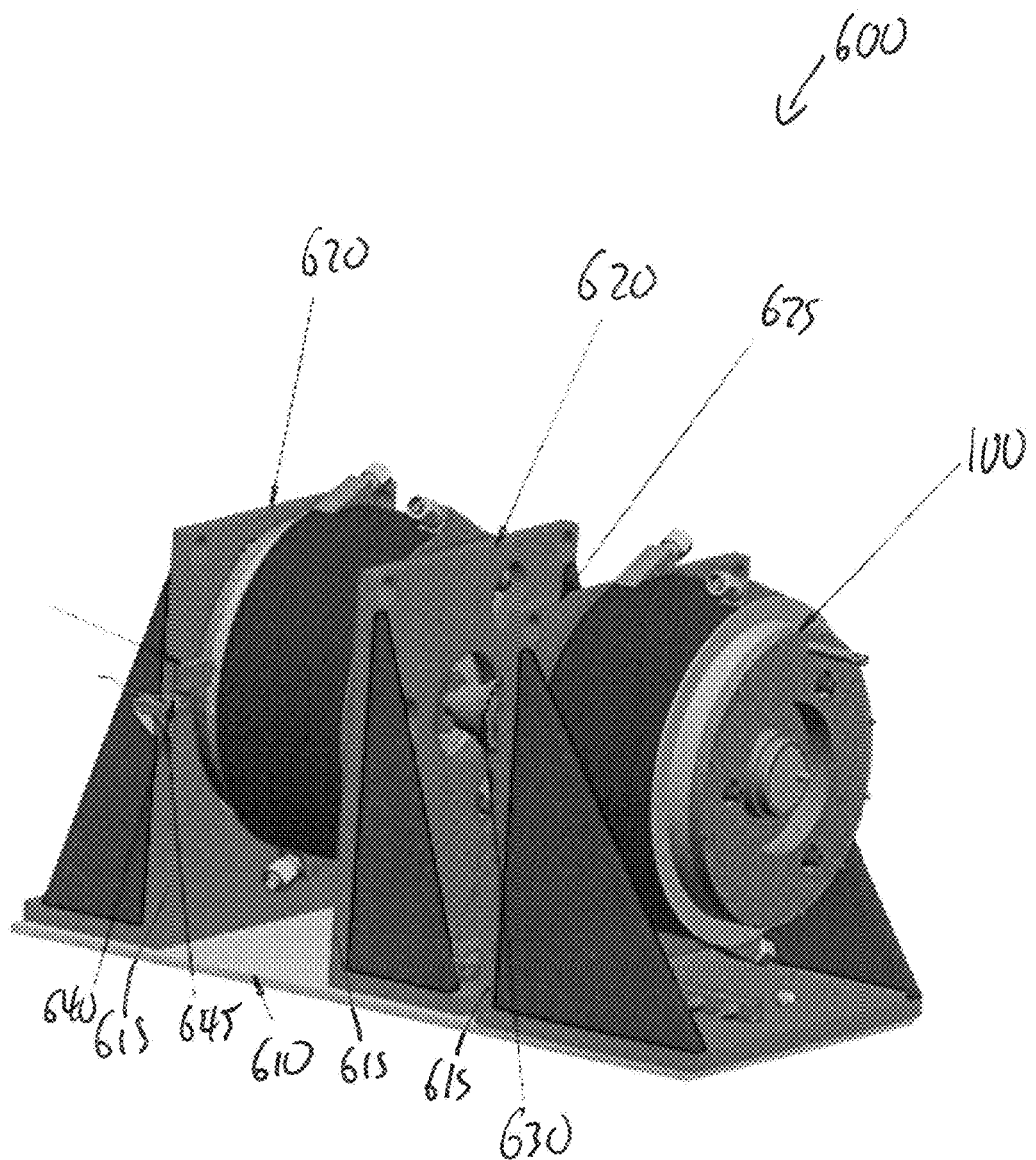
FIG. 25 is a perspective view of an example test stand for use with a high-speed high-power switched reluctance machine.
Figure 26:
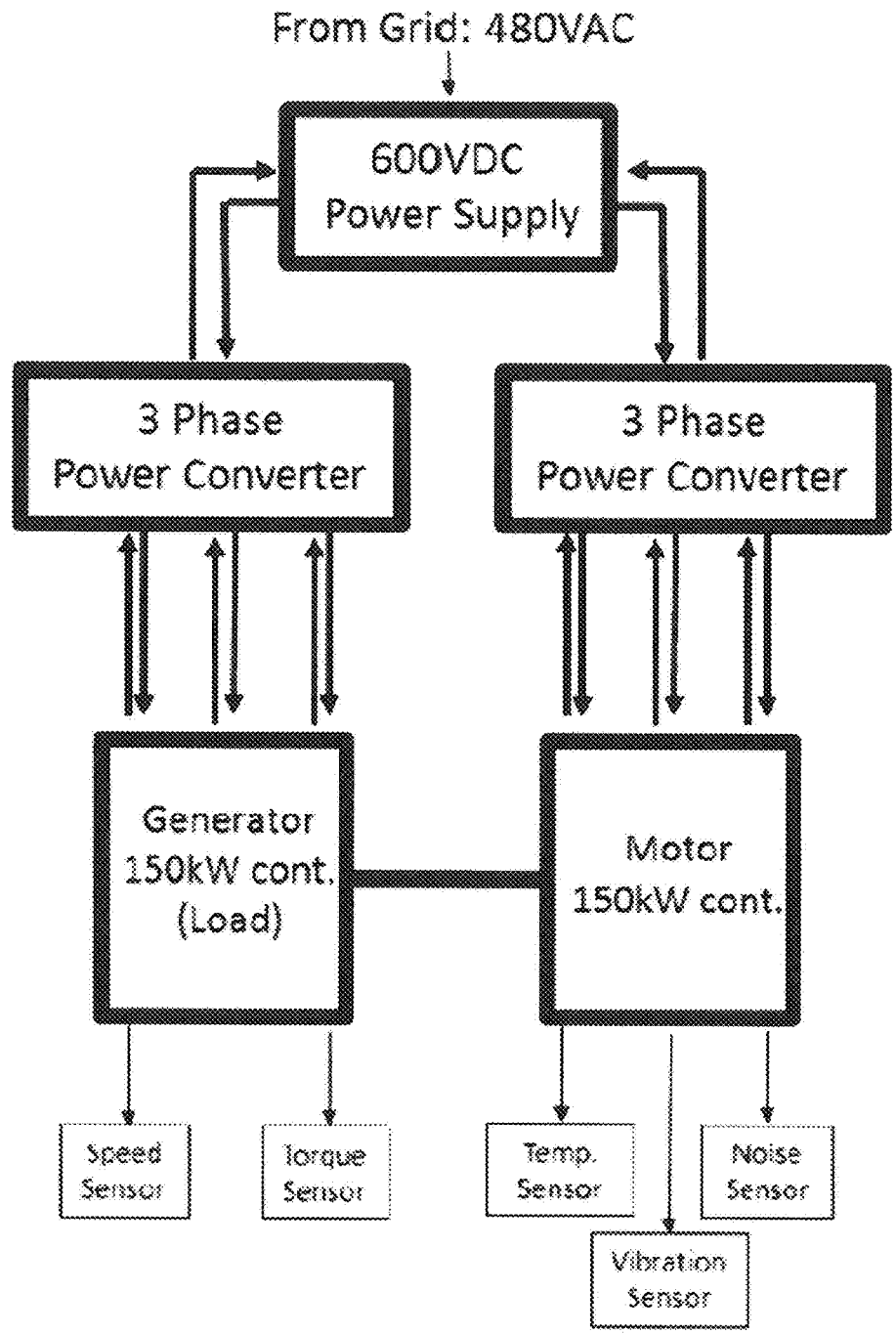
FIG. 26 is schematic control diagram for the test stand of FIG. 25.

Therefore, turning to FIGS. 25 and 26, a test stand, shown generally as 600, has been designed for the high-speed high-power SRM 100. Test stand 600 includes a base 610,
vertical supports 615, two gimbaled motor fixtures 620, a motor fixture 625, a shaft coupling 630, and a load cell 640 mounted on a load cell shelf 645.

In test stand 600, another high-speed high-power Switched Reluctance Generator (SRG) is coupled with the SRM under test. For example, two SRM's 100 could be used, with one operating as a motor, and the other operating as a generator. The test stand 600 has fixtures and couplings designed for the high-speed high-power SRM and SRG. For the torque measurement, a Gimbaled motor fixture is applied, where force applied over a lever arm is measured by a load cell.

Gearbox

Figure 27:
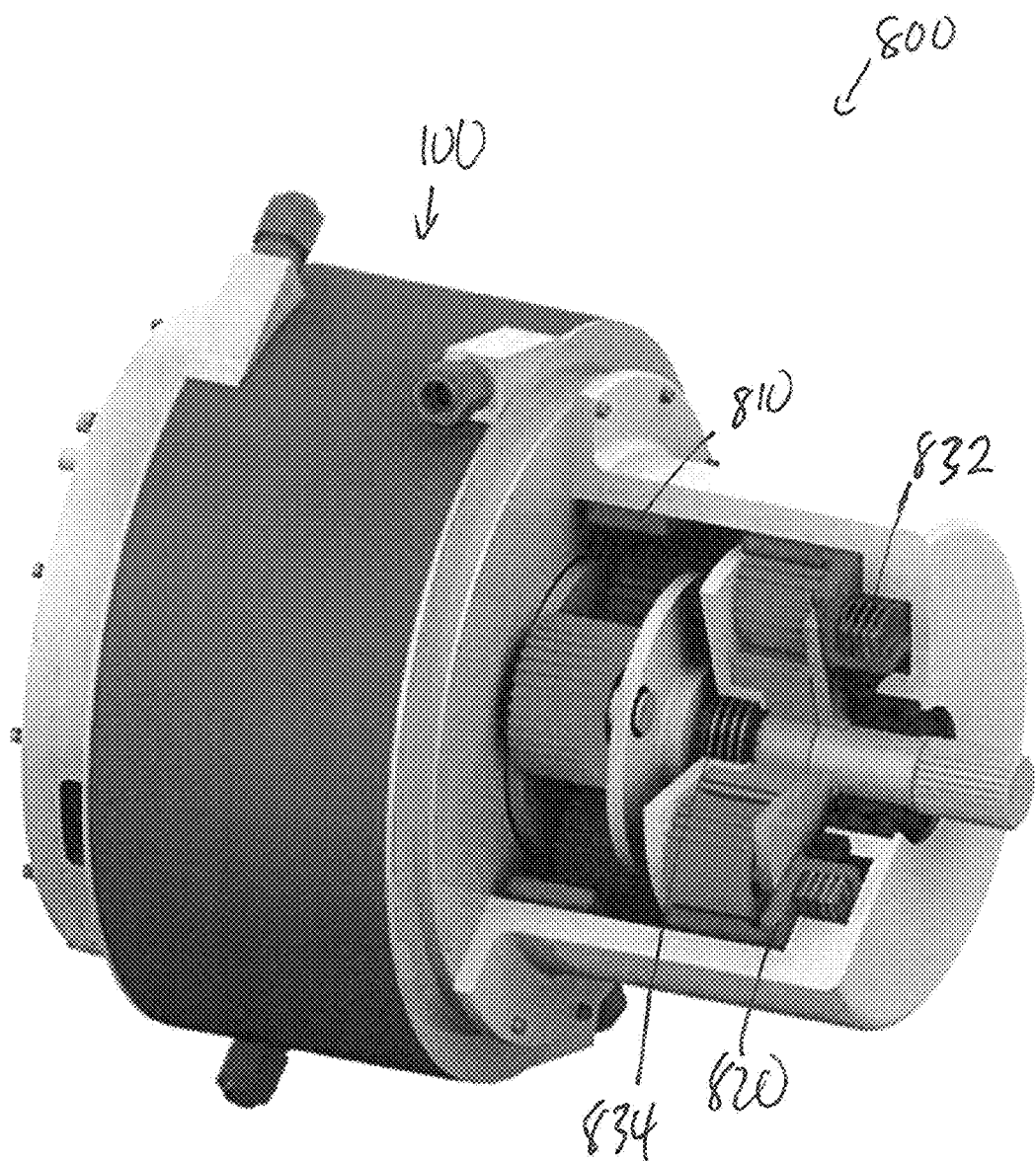
FIG. 27 is a perspective view of the switched reluctance machine of FIG. 1 mated to a gearbox, with a section of the outer components of the gearbox removed.

In order to transfer the power from high-speed high-power SRM 100 to the wheels of an electric- or hybrid-electric vehicle, a two-speed gearbox has been designed. As shown in FIG. 27, the gearbox (or transmission), referred to generally as 800, is coupled to the shaft 122 of SRM 100, and comprises a planetary transmission including a fixed gear ring 810, a moveable gear ring 820, and clutches 832 and 834.

The gears have been selected and designed according to drivetrain requirements (e.g. speed, acceleration, efficiency, etc.), drive shaft vibrations and shifting behavior of the vehicle. The gears are designed to accommodate the torque ripples from the high-speed high-power SRM 100.

The transmission has four functions: neutral, first gear, second gear, and brake: both clutches disengaged is neutral; Clutch 832 engaged is gear stage 1; Clutch 834 engaged is gear stage 2; and both clutches engaged would cause the transmission 800 to act a brake.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that variations are possible in variant implementations and embodiments.

The invention claimed is:

1. A switched reluctance machine designed for high-speed high-power operation, the switched reluctance machine comprising:

a shaft having a first end, a second end, and a longitudinal axis, the shaft being rotationally supported at the first end by a first bearing and at the second end by a second bearing;

a rotor coupled to the shaft, the rotor having an inner rotor diameter and a plurality of rotor poles extending radially from the inner rotor diameter, the distal ends of the rotor poles defining an outer rotor diameter;

an interpolar filler positioned between each of the plurality of rotor poles and extending from the inner rotor diameter to the outer rotor diameter;

a machine frame positioned about the rotor, the machine frame having spaced-apart first and second ends, an inner surface, and an outer surface;

a first machine end plate secured to the first end of the machine frame and configured to support the first bearing;

a second machine end plate secured to the second end of the machine frame and configured to support the second bearing;

a plurality of stator poles extending radially inwardly from the inner surface of the machine frame, the distal ends of the stator poles defining an inner stator diameter, the inner stator diameter and the outer rotor diameter defining an air gap therebetween;

a stator winding positioned about each of the plurality of stator poles, each stator winding comprising one or more strands of a stator wire wound about its respective stator pole, each of the one or more strands of stator wire having a rectangular cross-sectional profile;

an axial cooling system comprising one or more axial cooling conduits positioned between the stator poles and radially outward of the inner stator diameter, each axial cooling conduit having an inlet end and an outlet end and configured to allow circulation of an axial cooling fluid between its inlet and outlet ends;

an end turn cooling system comprising one or more axial cooling conduits positioned proximate the axial ends of the stator windings, each end turn cooling conduit having an inlet end and an outlet end and configured to allow circulation of an end turn cooling fluid between its inlet and outlet ends;

one or more cooling ribs extending radially outwardly from the outer surface of the machine frame;

a cooling jacket comprising one or more cooling jacket conduits positioned radially about the machine frame, each cooling jacket conduit having an inlet end and an outlet end and configured to allow circulation of a cooling jacket fluid between its inlet and outlet ends; and a power source configured to selectively supply electrical power to the one or more stator windings to induce rotation of the rotor.

2. The switched reluctance machine of claim 1, wherein the plurality of rotor poles comprises 8 rotor poles, and wherein the plurality of stator poles comprises 12 stator poles.

* * * * *